United States Patent [19]

Coleman et al.

[11] Patent Number: 5,440,687
[45] Date of Patent: Aug. 8, 1995

[54] COMMUNICATION PROTOCOL FOR HANDLING ARBITRARILY VARYING DATA STRIDES IN A DISTRIBUTED PROCESSING ENVIRONMENT

[75] Inventors: Ronald G. Coleman, Hyde Park; Deepak M. Advani, Port Ewen; Owen K. Monroe; Robert M. Straub, both of Kingston; Miner H. Gleason, III, West Hurley; Yun-Pong Huang, Hurley, all of N.Y.

[73] Assignee: International Business Machines Corporation, Armonk, N.Y.

[21] Appl. No.: 10,917

[22] Filed: Jan. 29, 1993

[51] Int. Cl.$^6$ .................. G06F 12/00; G06F 13/00
[52] U.S. Cl. .................. 395/200.15; 395/700; 395/497.02; 364/229.2; 364/240.8; 364/242.33; 364/242.94; 364/251; 364/260.1; 364/DIG. 1
[58] Field of Search ............... 395/200, 250, 400, 425, 395/275, 500, 600, 800; 370/53, 60, 60.1, 61, 85.1, 85.9, 92, 94.1, 94.3, 105, 124; 365/220, 221, 230.01, 230.02, 230.08; 360/18, 22, 24, 39, 55; 340/825, 825.06, 825.07, 825.52, 825.53

[56] References Cited

U.S. PATENT DOCUMENTS

| | | | |
|---|---|---|---|
| 4,363,093 | 12/1982 | Davis et al. | 395/200 |
| 4,494,230 | 1/1985 | Turner | 370/60 |
| 4,555,774 | 11/1985 | Bernstein | 340/825.55 |
| 4,777,595 | 10/1988 | Strecker et al. | 395/200 |
| 4,797,809 | 1/1989 | Sato et al. | 395/425 |
| 4,858,112 | 8/1989 | Puerzer et al. | 395/325 |
| 4,888,679 | 12/1989 | Fossum et al. | 395/800 |
| 4,897,835 | 1/1990 | Gaskill et al. | 370/94.1 |
| 4,972,367 | 11/1990 | Burke | 395/275 |
| 5,051,892 | 9/1991 | Ferree et al. | 395/325 |
| 5,105,422 | 4/1992 | Noll et al. | 370/110.1 |
| 5,111,389 | 5/1992 | McAuliffe et al. | 395/800 |
| 5,151,899 | 9/1992 | Thomas et al. | 370/94.1 |
| 5,235,595 | 8/1993 | O'Dowd | 370/94.1 |
| 5,237,670 | 8/1993 | Wakerly | 395/425 |
| 5,291,582 | 3/1994 | Drako et al. | 395/425 |
| 5,325,486 | 6/1994 | Omori et al. | 395/164 |
| 5,357,618 | 10/1994 | Mirza et al. | 395/400 |

FOREIGN PATENT DOCUMENTS

0465014A2  1/1992  European Pat. Off. .

*Primary Examiner*—Alyssa H. Bowler
*Assistant Examiner*—Alpesh M. Shah
*Attorney, Agent, or Firm*—Floyd A. Gonzalez

[57] ABSTRACT

Apparatus and an accompanying method for implementing a communications protocol for use in generally a distributed, and particularly a highly parallel, multi-processing system (5), for communicating application data of arbitrarily varying strides between separate processors and generally without the need for intermediate data storage. Specifically, application data is transferred through a succession of packets (770) between originating and destination application programs (252), with each packet containing a partial data message. Each partial data message contains a portion of the data that is stored in a stride one portion of an originating application data memory (700). Upon reception, each data portion is written into a stride one portion of a destination application data memory (760). An application interface (254), executing independently at both the originating and destination processing elements ($10_1$, $10_{J+1}$) locally and respectively determines the starting address and length of each separate stride one data portion stored in the originating application data memory and for each separate stride one area in the destination application program memory that is to receive application data.

22 Claims, 12 Drawing Sheets

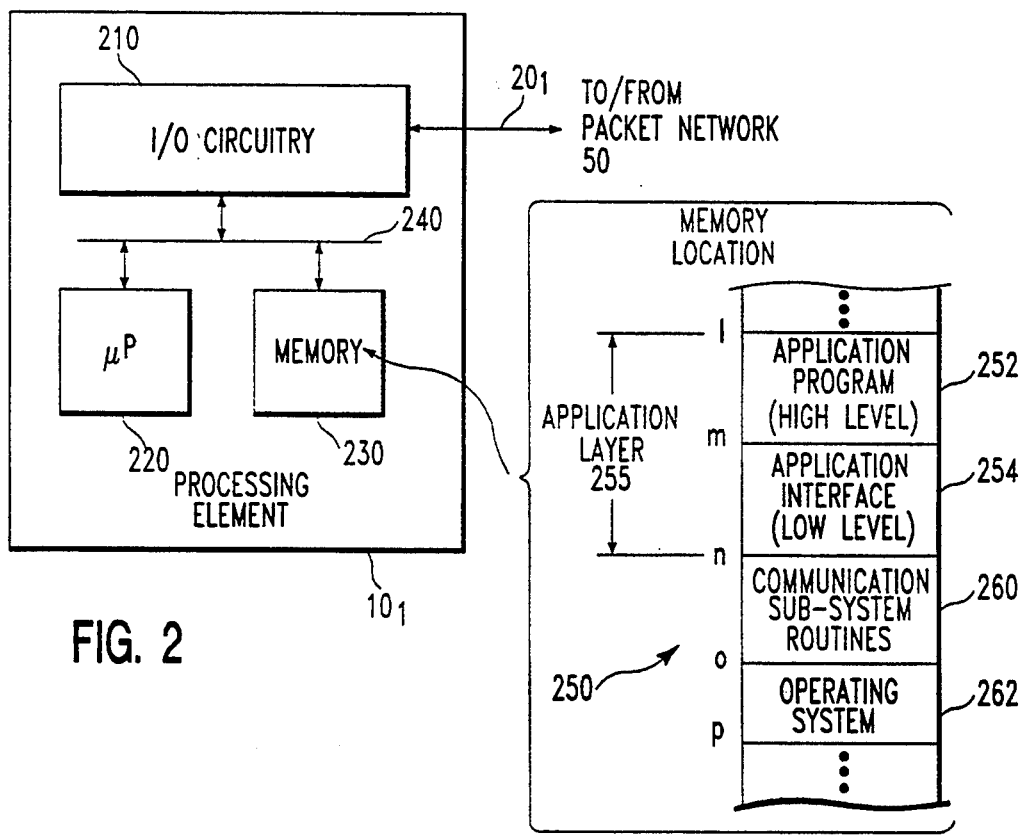
FIG. 2
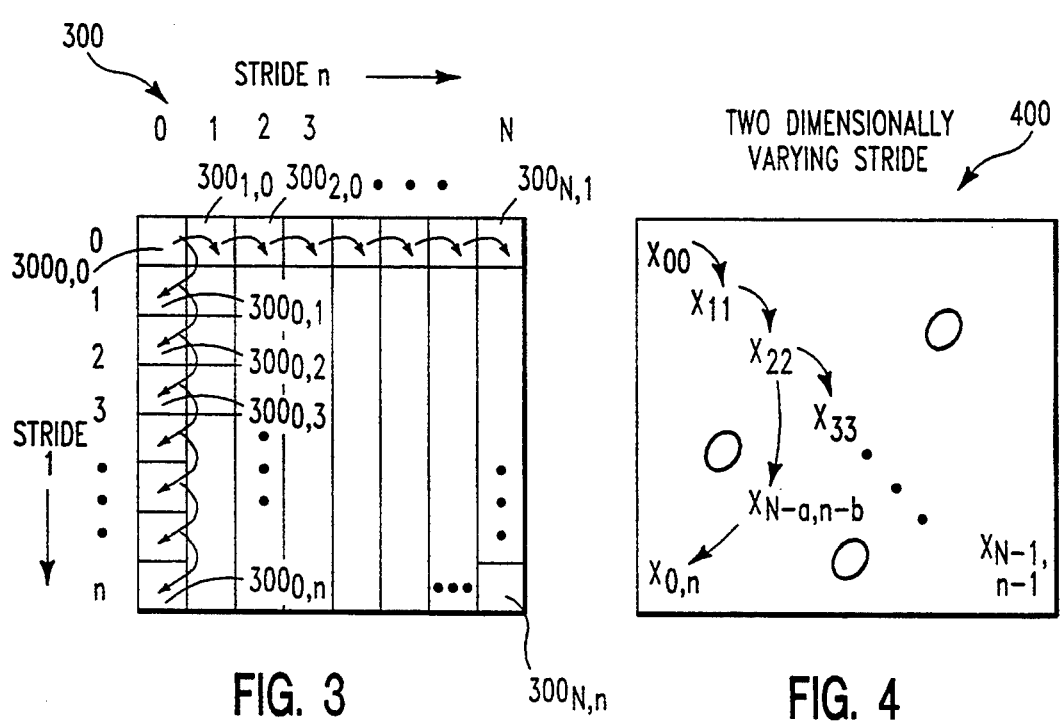
FIG. 3
FIG. 4

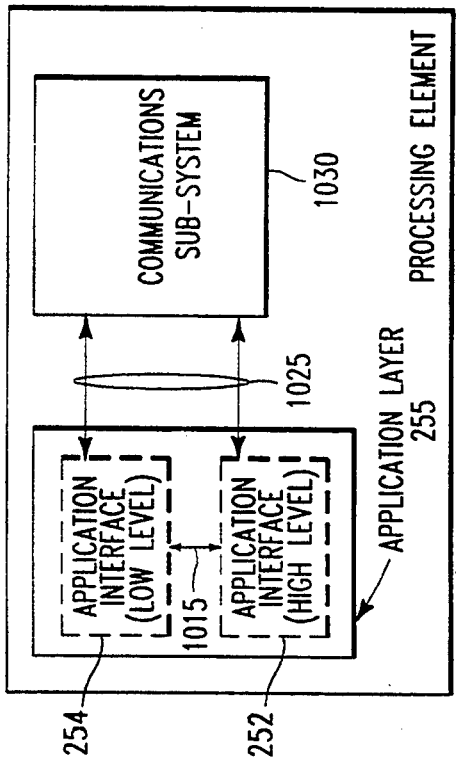
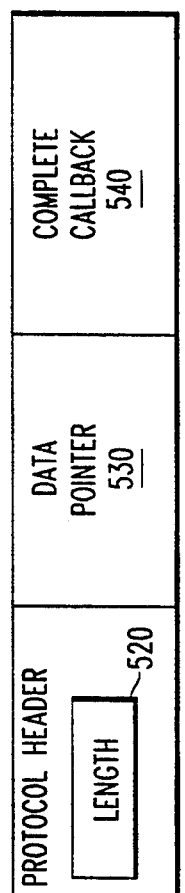
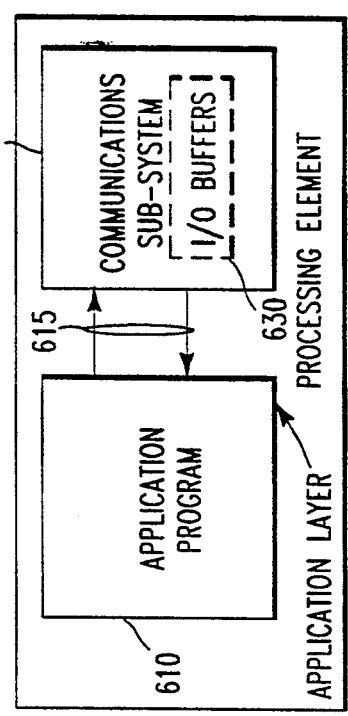
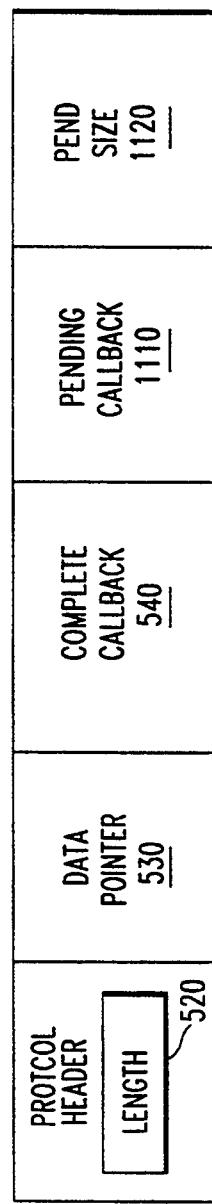

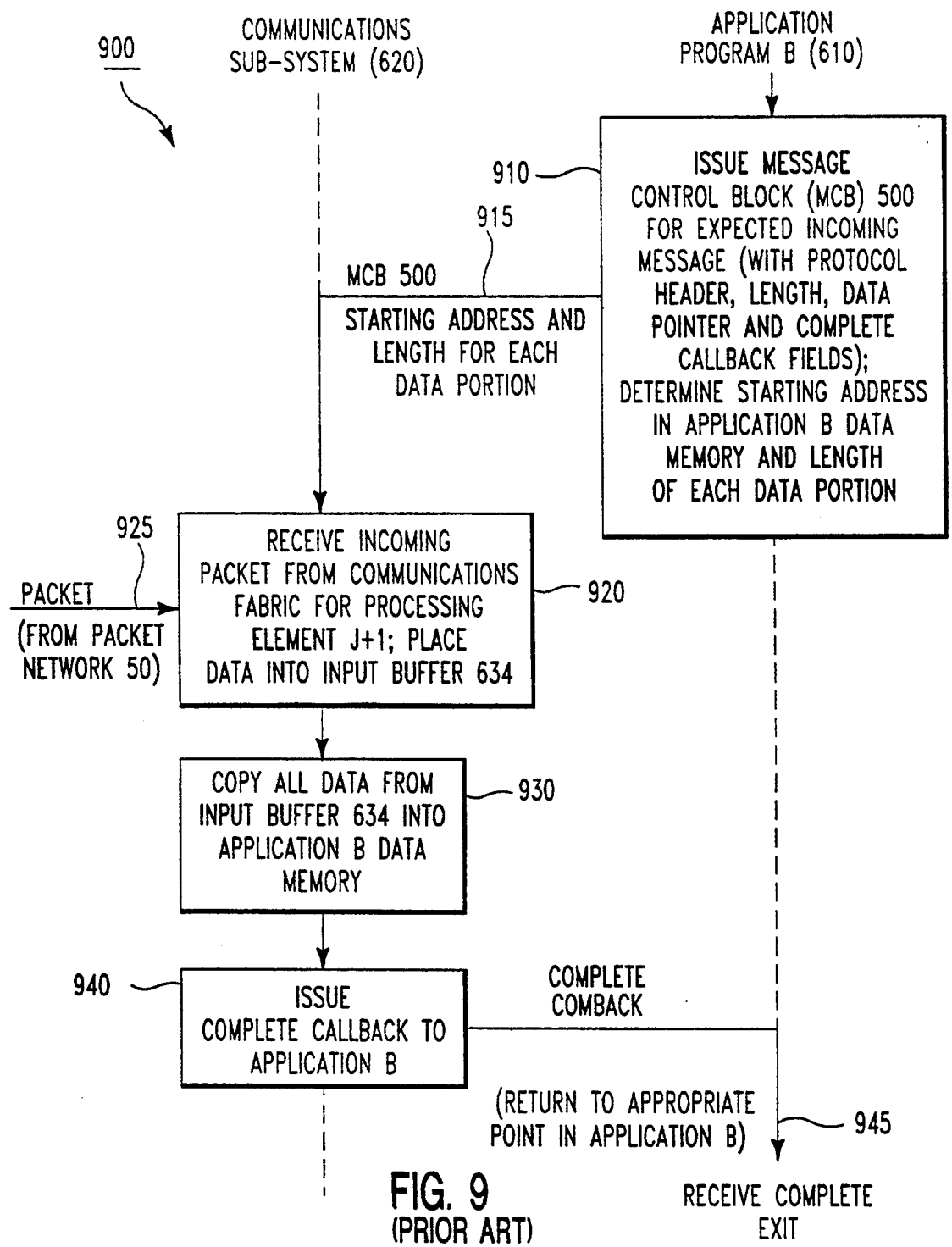

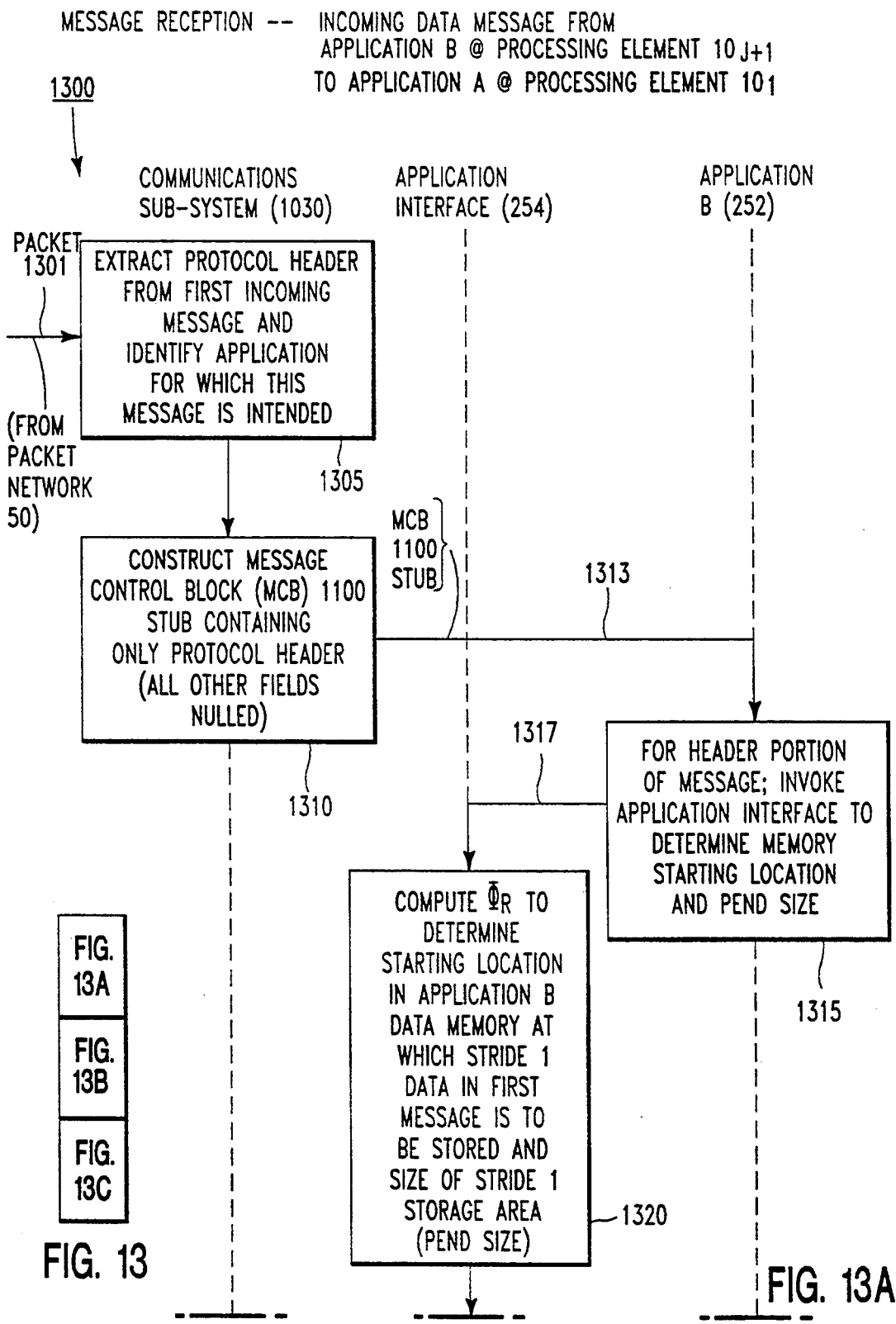

DATA FILTERING

DATA TRUNCATION

COMMUNICATION PROTOCOL FOR HANDLING ARBITRARILY VARYING DATA STRIDES IN A DISTRIBUTED PROCESSING ENVIRONMENT

BACKGROUND OF THE DISCLOSURE

1. Field of the Invention

The invention relates to apparatus and an accompanying method for a communications protocol in generally a distributed, and particularly a highly parallel, multi-processing environment, for communicating data of arbitrarily varying strides between separate processors and generally without the need for intermediate data storage.

b 2. Description of the Prior Art

With the continual evolution and commercial availability of increasingly powerful, sophisticated and relatively inexpensive microprocessors, distributed, and particularly massively parallel, processing is being perceived in the art as an increasingly attractive vehicle for handling a wide spectrum of applications, such as transaction processing, heretofore processed through conventional mainframe computers.

In general, distributed processing involves extending a processing load across a number of separate processors, all collectively operating in a parallel or pipelined manner, with some type of interconnection scheme being used to couple all of the processors together in order to facilitate message passing and data sharing thereamong. In the past, distributed processing architectures, of which many variants exist, generally entailed use of a relatively small number of interconnected processors, typically two and often less than ten separate highly sophisticated central processing units as would be used in a traditional mainframe or super-minicomputer, in which these processors would be interconnected either directly through, e.g., an inter-processor bus, or indirectly through, e.g., a multi-ported shared memory, such as a shared digital access storage device (DASD), or other communication path. By contrast, in massively parallel processing systems, a relatively large number, often in the hundreds or even thousands, of separate, though relatively simple, microprocessor based processing elements are inter-connected through a communications fabric formed of a high speed packet network in which each such processing element appears as a separate node on the network. In operation, the fabric routes messages, typically in the form of data packets, from any one of these processing elements to another to provide communication therebetween. Each of these elements typically contains a separate microprocessor and its associated support circuitry, the latter being typified by, for example, random access memory (RAM), for program and data storage, and input/output (I/O) circuitry. Based upon the requirements of a particular system, each element may also contain read only memory (ROM), to store initialization ("boot") routines as well as configuration information, and/or other circuitry.

Each distributed processing element, particularly in a massively parallel processing system, also contains a communication sub-system that interfaces that element to the communications fabric. Within each element, this sub-system is formed of appropriate hardware circuitry, such as a communications interface within the I/O circuitry, and associated controlling software routines, the latter being invoked by an application executing within that one element in order to communicate with any other such processing element in the system.

Improved system performance, particularly with attendant decreases in circuit complexity, cost and and-/or system size, is a primary goal in the design of any distributed processing environment. In the context of massively parallel processing, performance improvements can result from, inter alia, decreasing message transit time through the communications fabric and decreasing processing time undertaken within each processing element and necessitated by overhead tasks, such as handling inter-processor communication. Eliminating unnecessary circuitry within each element will reduce elemental complexity and concomitantly the physical size and cost of both each element and advantageously the overall system. Attaining improvements of this sort is particularly important in massively parallel processing environments given the substantial number of inter-processor messages that simultaneously pass through the system at any one time as well as the sheer number of individual processing elements involved and their combined space requirements. Accordingly, the following discussion will address the need for these improvements as they arise in the context of massively parallel processing systems.

As one can appreciate, message passing forms an integral component of any massively parallel processing system. To yield proper system performance, the communications fabric must provide a requisite capacity, based upon the number of separate processing elements connected thereto, to simultaneously route, at any time and without contention, an anticipated peak load of inter-processor messages. In addition, each processing element itself must only spend a minimal amount of time in handling its overhead tasks, such as those, for example, required by the communication sub-system to transmit and receive messages through the communications fabric. Clearly, an insufficient communications throughput or a reduced amount of application processing time available at each processing element will adversely affect system throughput, possibly to a point of, sharply reducing the attractiveness of using a massively parallel processing system in a given application. Fortunately, various different architectures for packet networks have been proposed in the art that, at least for the time being, should afford a sufficiently high transfer rate to handle the needed peak message traffic which is expected to occur in a typical massively parallel processing system. However, as will be seen below, the art has not adequately reduced overhead processing time associated with message passing undertaken by the communication sub-system. With this in mind, the bandwidth of a high speed communications fabric tends to be much less of a limitation on application throughput, and hence overall system performance, than does the overhead time required by each processing element to communicate a message.

Furthermore, reducing the physical size of each processing element is also of paramount importance, particularly where hundreds or thousands of separate processors are used in a single system, else that system would simply become too large, require an excessive amount of power and generally become quite impractical.

An underlying solution that would help attain this goal would be to transfer messages, particularly data, among processors in a manner that both is increasingly faster and uses much less memory than has been conventionally taught in the art. In this regard, system throughput can be significantly increased if each processing element could spend considerably less overhead time in transmitting and receiving messages. Furthermore, if intermediate memory requirements, as discussed below, associated with message passing could be reduced, even hopefully eliminated, then each processing element would require less circuitry and hence consume less physical space and entail less cost than heretofore needed.

In order to fully appreciate this significance of attaining this solution, one must first understand how messages, particularly data, are conventionally communicated between individual processing elements and the specific problems associated therewith.

Generally speaking, data takes many forms; however, physical memory takes only one form. In this regard, data can be structured in any of a wide variety of ways. For example, a data structure can be a simple list, i.e. a vector, of numbers with each number in the list simply following an immediately preceding number therein: one number directly after another. In this case, the data is organized in so-called "stride one", or a "linear" mapping, i.e. each data element successively and consecutively follows a previous one with no gaps therebetween. If data is organized in matrix form, stored column-wise and accessed along a column, then stride one data can be viewed as a column of a matrix with movement being from one data element to the next downward through each column. In essence, each successive element in the column can be reached by simply increasing an address for an immediately preceding element by "one". Linear mapping occurs within each column. If the matrix has "n" rows, then each row is said to be of constant stride "n". In this instance, to access successive elements in a row, a complete column of data, i.e. "n" data locations ("addresses"), must be skipped over to reach each successive data element. Here, the stride would be constant and regular at value "n". Matrices can also be sparse, i.e. a relatively small number of non-zero valued data elements is dispersed throughout a relatively large matrix with zero valued elements located everywhere else. An identity matrix having elements only along its diagonal is one such example. With sparse matrices, and depending upon the matrix location of the each non-zero element, these elements (at least not for an identity matrix) will likely have varying (non-constant) and irregular strides, in that the address increment needed to access each successive element, as measured from the location of a prior element, can and often does vary on an irregular basis throughout the entire matrix. Furthermore, not only can data be organized to possess irregular strides, these strides can be arbitrarily complex. In that regard, the location of the data in the matrix can be a function of the data itself. In that scenario, the location of a successive data element may not be readily determined until an immediately prior data element is found and the function calculated. For simplicity, arbitrarily varying strides will hereinafter be generically defined to include complex data strides.

Physical memory is only organized in stride one; it takes no other form. Each memory location immediately follows a prior location and can be accessed by simply incrementing the memory address of the prior location by one. In this regard, memory location zero is reached by incrementing the address of the last memory location by one thereby causing the memory address to "wrap".

Within physical memory and owing to various operating constraints (none of which is particularly relevant here), data can not always be stored simply in successive memory locations; in fact, individual items of data can be stored essentially anywhere in physical memory and, in fact, are often scattered somewhat throughout a given area in memory. As such, data is often stored in the form of a linked list. In particular, each element in such a list typically contains two fields: a data field and an address pointer to the location in memory of the next successive element in the list. In a simple one-dimensional data structure, such as a vector, each item in the list contains one data field and a single address pointer to the next element in the list, and so forth until the last element is reached which contains a corresponding data element but with "null" valued pointer. Alternatively, in the case of a two-dimensional matrix data structure, depending upon the ordering of the matrix elements, each list element may contain two pointers: one designating a list element that contains the next successive data element in a horizontal matrix direction and the other pointer designating a different list element that contains the next successive data element but in a vertical matrix direction. In this regard, to conserve memory space, only non-zero elements in a sparse matrix can be stored efficiently in physical memory.

Unfortunately, inasmuch as individual list elements in a data structure can be scattered throughout memory, the stride associated with accessing each of these individual elements in that structure may, a priori, be unknown. Accordingly, this necessitates that in order to access a given list element in a structure, all prior elements must be accessed in order to obtain the pointer to the desired element. In contrast, where data is organized at a constant (regular) stride in memory, or preferably with stride one, direct memory access (DMA) can be used to provide highly efficient data transfer since constant address increments can be used to access each successive data element. However, as will be seen below, owing to the need to calculate a proper varying memory increment for each data access, use of DMA becomes very inefficient for transferring data stored with arbitrarily varying strides.

Given the idiosyncrasies associated with storing data of arbitrarily varying strides in physical memory and accessing the data therefrom, complications and inefficiencies arise whenever that data is to be communicated from memory associated with one processing element to memory associated with another such element. Specifically, a data message by its very nature contains a linear succession of data values—one value follows the next; hence, a message only contains stride one data—regardless of the actual structure of the underlying data. Consequently, as conventionally taught in the art, each node in a packet communication system typical contains two separate I/O buffers: an input (transmission) buffer into which an outgoing message is fully assembled prior to transmission and an output (receiving) buffer into which an incoming message is completely built prior to its subsequent use. The use of such buffers, in the general context of packet communications, is typified by the systems described in U.S. Pat. Nos. 5,151,899 (issued to R. E. Thomas et al on Sep. 29, 1992); 4,858,112 (issued to B. G. Puerzer et al on Aug. 15, 1989) and 4,555,774 (issued to L. Bernstein on Nov. 26, 1985).

Hence, to transfer data of an arbitrarily varying stride, particularly from one processing element to another in a massively parallel processing system, the communication sub-systems, in the transmitting and receiving processing elements, are required, due to the need to route the data through stride one I/O buffers, to convert the data to and from stride one. In particular, consider the following example, where a data structure of, e.g., an arbitrarily varying stride x (where x is a varying integer), is to be transmitted by application program A executing at a source processing element to application program B executing at a destination processing element. As conventionally taught, in response to a command issued by application program A, a communication sub-system employed within the source processing element would successively access, from memory, and copy each and every item of the data structure that has been stored in a linked list through a so-called "gather" operation. Through this operation, successive linear locations in a stride one output buffer would be filled, on a one-for-one basis, with successive items of the data in this linked list. Once the entire data structure has been stored within this buffer, the communication sub-system would then append appropriate message header and trailer information to the buffer contents to form a complete packet and thereafter transmit the entire packet through the communications fabric to the destination processing element. In response to the incoming packet, the communication sub-system executing at the destination element would then serially fill an input buffer with the complete message as it is received. Once this buffer has captured the entire message, this sub-system would perform a so-called "scatter" operation to re-create the linked list in memory for subsequent use by application program B (though, due to memory constraints thereat, at typically different memory locations and often at a different arbitrarily varying stride than those used at the source processing element). Specifically, this "scatter" operation entails individually copying each and every data item from the input buffer and successively storing that item in the destination processing element memory such that the incoming data is distributed throughout the memory with stride y (with y being an arbitrarily varying integer generally not equaling x) as required by application program B).

Unfortunately, processing time is consumed in performing "gather" and "scatter" operations. Now, regardless of where these overhead operations are actually performed within each processing element, i.e. in either the communications sub-systems (as discussed above) or by the application programs themselves executing in these elements, the amount of processing time required by these operations decreases the processing time that is otherwise available at that element, hence decreasing its application throughput.

In fact, the overhead associated with communicating large amounts of data through stride one I/O buffers tends to seriously degrade overall system performance. In particular, at a transmitting end, where data is organized in arbitrarily varying, and particularly a complex, stride, a significant amount of overhead processing time can be consumed in just calculating the proper address increments to access each successive data item from memory. In the absence of sophisticated DMA circuitry (which, for reasons of simplifying circuitry and reducing cost, is generally not used in a massively parallel processing element), this overhead can be substantial for a large amount of data and thus inject substantial latency into the system. Furthermore, serious delays can occur on the receiving end owing to the finite size of the input buffer. In particular, if a large amount of data that exceeds the size of an input buffer is to be received, then a so-called "rolling window" technique must be used to transmit only as much data, in any one message, as will fill the input buffer. To prevent congestion and possible over-writing, the receiving processing element must utilize flow control, in conjunction with the transmitting element, in order for the receiving element to fully "scatter" its received data and thus fully empty its input buffer before receiving any further data from the transmitting element. Consequently, in practice, the limited size of the input buffer within each processing element also limits elemental and often system throughput.

Thus, a need exists in the art for a protocol, particularly apparatus and an accompanying method therefor, for use in a distributed processing environment, with particular though not exclusive attractiveness in a massively parallel processing system, for efficiently handling inter-processor element transfers of data with arbitrarily varying strides. Such a protocol should preferably eliminate the need for routing incoming and outgoing message data through I/O buffers in each processing element. Removal of these buffers would advantageously eliminate the need to copy the data, both on transmission and reception, thereby significantly reducing processing time, i.e. overhead, required to facilitate message passing. This, in turn, would free processing time for each such element thereby increasing application throughput of that element and concomitantly of the entire system. In addition, by eliminating these buffers, each processing element would become simpler, and require less circuitry and cost than has been required heretofore. This, in turn, would reduce the cost of the entire processing system. Moreover, by removing these buffers, the physical size of each element could be advantageously reduced, which, given the sheer number of such elements used in a massively parallel processing system, could, among other benefits, advantageously and significantly reduce the size of the entire system.

SUMMARY OF THE INVENTION

Advantageously, we have invented a communications protocol which eliminates the deficiencies associated with use of conventional communications protocols for transferring application data of arbitrarily varying strides between processing elements in a distributed processing environment, and particularly though not exclusively in a massively parallel processing environment.

Specifically, our inventive protocol relies on transferring application data not in just one but rather in a succession of packets, where each packet contains a partial data message, between originating and destination application programs. Each partial data message contains a portion of the data that is stored in a stride one portion of an originating application data memory. An application interface, which also forms part of our inventive protocol, locally determines the starting location and length of each separate data portion. Upon reception, each data portion is written into a stride one portion of a destination application data memory. An application interface, executing independently at both the originating and destination processing elements locally and respectively determines the starting address and length of each separate stride one data portion stored in the originating application data memory and for each separate stride one area in the destination application program memory that is to receive application data. Advantageously through use of these independent application interfaces, application data can be transferred from the originating application data memory at one arbitrarily varying stride to the destination application memory with a different arbitrarily varying stride but without the need to pass the data through any input-/output (I/O) buffers.

In accordance with our inventive technique to control the transfer of each data portion, we utilize an inventive message control block (MCB) that contains two additional fields, i.e. "pending callback" and "pend size", both of which are not present in a conventional message control block. For each partial message, the pend size specifies the length of the data portion contained within that message. The pending callback contains a pointer to the first instruction in an application interface.

For message transmission, our inventive application interface utilizes an application data specific sending filler function to determine the starting location and size of each partial data message as it is stored in non-contiguous stride one portions of the originating application data memory. After each such partial message is constructed and transmitted as a separate packet, the communications sub-system determines whether any data portions remain to be transferred, hence whether any further partial messages need to be transmitted. If so, the pending callback is used to return execution, in the form of a "transmit pending exit", to the application interface to determine the starting location and data length for the next stride one data portion, and then, through the communications sub-system, read that data portion, and finally construct and transmit a packet containing that data portion, and so on for all remaining data portions. Alternatively, if a partial message containing the last data portion has been transmitted, the communications sub-system invokes a complete callback as specified in the message control block to establish a transmit complete exit.

For message reception, our inventive protocol functions in a highly similar, though essentially reverse manner. Specifically, after each partial message is received, our inventive application interface utilizes a receiving filler function to determine, based upon requirements of the destination application, the starting location and length of a stride one memory area in the destination application memory within which this data portion is to be stored (either partially or fully, depending upon the size of the data portion relative to the memory area). This information is provided to the destination application program which updates a (specifically, our inventive) message control block, that initiated the receive operation, by setting the pend size equal to the length and the data pointer to the starting location. The updated MCB is then provided to the communications sub-system (functioning within the destination processing element) which, upon subsequent receipt of this partial message, merely writes the data portion contained therein into the stride one memory area at the starting address and for the specified length. After each partial message is received, the communications sub-system determines whether any data portions are missing, i.e. whether any partial messages still remain to be received. If so, the pending callback within our inventive MCB is used to return execution, in the form of a "receive pending exit", to the application interface to determine the starting location and data length of a stride one memory area for the next data packet, and then, through the communications sub-system, extract that data portion from the next incoming packet and merely write that portion into this area in the destination application memory, and so on for all remaining data portions. Alternatively, if a partial message containing the last data portion has been received, the communications sub-system invokes the complete callback, specified within the MCB, to establish a receive complete exit.

Advantageously, through use of a separate application interface on each side of a data transfer, the pend size and length determinations are independently and locally made for this data by both the originating and destination processing elements. Consequently, as long as a proper filler function is used in the interface and for each different application program associated therewith, the proper area of the corresponding application data memory can be successively addressed to read or write each data portion at an associated arbitrarily varying stride. Hence, our inventive protocol provides a generalized mechanism for moving application data from one memory to another with different arbitrarily varying strides and independent of the length of the data.

By eliminating the need to use intermediate I/O buffers to convert data of one arbitrarily varying stride to another, our inventive protocol advantageously yields concomitant savings in circuit complexity, physical size and cost in each processing element as well as in the overall system. Moreover, by eliminating the processing overhead otherwise required to copy application data through these buffers, application processing throughput for each processing element and hence of the entire system can significantly increase.

Moreover, as a feature, our inventive protocol can be readily used to provide data filtering and truncation. Upon data transmission, application data can be filtered to eliminate unwanted sections of this data by merely setting the data pointer, through use of the sending filler function, to skip over each of those sections of the data. Truncation can be provided, during data reception, by the receiving filler function merely setting the pend size to zero. This will signal the communications sub-system in the destination processing element that no further partial data messages are to be received for the current application data transfer and hence a receive complete exit is to occur.

BRIEF DESCRIPTION OF THE DRAWINGS

The teachings of the present invention can be readily understood by considering the following detailed description in conjunction with the accompanying drawings, in which:

FIG. 2 depicts a high level block diagram of illustratively processing element $10_1$ utilized in processing system 5 and abbreviated memory map 250 of memory 230, and specifically software stored therein, situated within this processing element;

FIG. 3 depicts matrix 300 that possesses a constant stride between successive horizontally and vertically arranged data elements situated therein;

FIG. 4 depicts matrix 400 that possesses a varying stride between successive data elements situated therein;

FIG. 5 depicts conventional message control block 500 and its constituent fields;

FIG. 6 depicts, in high level block diagram form, those processes that are utilized to implement a conventional protocol within each processing element, e.g. element $10_1$, for handling inter-processing element data transfers;

FIG. 9 depicts a high level functional block diagram of the conventional protocol for inter-processor data communication and particularly portion 900 of that protocol operating within illustratively processing element $10_{J+1}$ for receiving application data, for storage at an arbitrarily varying stride, from another such processing element, e.g. element $10_1$, situated within system 5;

FIG. 10 depicts, in high level block diagram form, those processes that are utilized to implement our inventive protocol within each processing element, e.g. element $10_1$, for handling inter-processing element data transfers of an arbitrarily varying stride;

FIG. 11 depicts our inventive message control block 1100 and its constituent fields;

FIG. 13 depicts the correct alignment of the drawing sheets for FIGS. 13A–13C;

FIGS. 13A–13C collectively depict a high level functional block diagram of our inventive protocol for inter-processor data communication and particularly portion 1300 of that protocol operating within illustratively processing element $10_{J+1}$ for receiving application data for storage, at an arbitrarily varying stride, from another such processing element, e.g. element $10_1$, situated within system 5;

To facilitate understanding, identical reference numerals have been used, where possible, to designate identical elements that are common to various figures.

DETAILED DESCRIPTION

After considering the following description, those skilled in the art will clearly realize that the teachings of our invention can be readily utilized in any distributed multi-processing environment, and, generally speaking, in any processing environment in which data of arbitrarily varying (including complex) strides needs to be transferred from memory associated with one processing element to memory associated with another. Nevertheless, to simplify the following description, our invention will be discussed in the context of use with a massively parallel processing system that utilizes a packet network to facilitate inter-processor communication. However, since our invention is not limited to any particular application and is applicable to transferring, on an inter-processor message basis, application data stored in any arbitrarily varying stride (as discussed in detail below), the following discussion will not address any particular application.

A. Processing Environment

Figure 1:
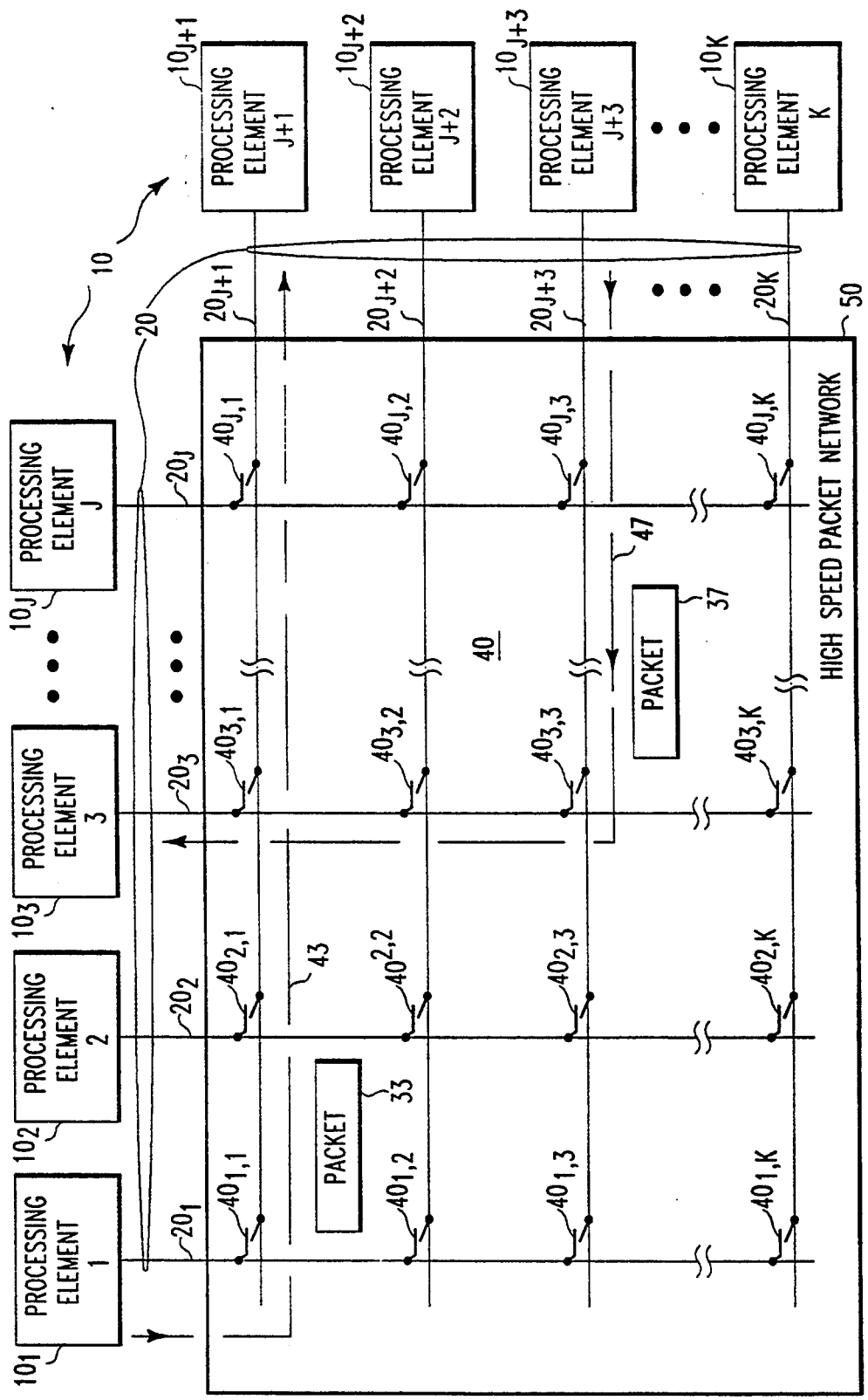
FIG. 1 depicts a very high level simplified block diagram of a typical massively parallel processing system, i.e. system 5, that utilizes our present invention.

Specifically, FIG. 1 depicts a very high level simplified block diagram of massively parallel processing system 5 that utilizes our present invention. In general, this system is formed of a relatively large number (K) of separate processing elements 10 that are used to process distinct portions of an application in parallel. In order for each of these processors to perform its individual application processing task, that processor communicates, through a packet network, and specifically transfers application data through packet messages, with other processors, as the need requires. Each processor undertakes its associated application processing upon receipt of the needed data from other processing elements and then communicates the results of that processing onward to another processing element(s), again by packet messages, for subsequent use therein, and so on.

In particular and to the extent relevant, system 5 is formed of high speed packet network 50 and K identical microprocessor based processing elements 10 that, through paths 20, are all connected to the network. This network provides a cross-point based packet communications fabric that is capable of routing packets among any pair of processing elements 10. In this regard, switch 50 is functionally formed of J-by-K cross-point switching matrix 40 that contains separate cross-points, symbolized by switching contacts, $40_{1,1}$; $40_{2,1}$; ..., $40_{J,K}$ that selectively, and under direction of routing information contained in a packet header, connect corresponding vertical and horizontal networking paths 20 to establish a packet connection between any two processing elements. Each of these paths terminates at a corresponding microprocessor based processing element. In this regard, processing elements $10_1$, $10_2$, $10_3$, . . . $10_J$; and $10_{J+1}$, $10_{J+2}$, $10_{J+3}$, . . . , $10_K$ are connected to network 50, via respective paths $20_1$, $20_2$, $20_3$, . . . , $20_J$ and $20_{J+1}$; and $20_{J+2}$, $20_{J+3}$, . . . , $20_K$. For example, processing element $10_1$ can communicate application data to processing element $10_{J+1}$ by forming packet 33, which through its embedded routing information, instructs network 50 to close cross-point $40_{1,1}$ thereby establishing a packet connection, as symbolized by dashed line 43, to route this packet between these two specific processing elements. Likewise, processing element $10_{J+3}$ can communicate application data to processing element $10_3$ by forming packet 37, which through its embedded routing information, instructs network 50 to close cross-point $40_{3,3}$ thereby establishing a packet connection, as symbolized by dashed line 43, to route this packet between these two particular processing elements.

Packet network 50 can be implemented with any one of a wide variety of different architectures, such as through illustratively use of asynchronous transfer mode; however, the particular architecture chosen and its details, along with the manner through which it accomplishes internal packet routing, are all irrelevant to the present invention and thus will not be discussed in any detail hereinbelow.

Inasmuch as all the processing elements are identical, this discussion will now center on element $10_1$. With this in mind, FIG. 2 depicts a high level block diagram of illustrative processing element $10_1$ utilized within processing system 5.

At a high level, element $10_1$ is formed of microprocessor 220, memory 230 and input/output (I/O) circuitry 210 all of which are inter-connected through internal bus 240. To increase system performance and throughput, the microprocessor is preferably implemented using reduced instruction set computing (RISC) circuitry. However, since our present invention is independent of the particular microprocessor chosen as well the implementation of I/O circuitry 210 and memory 230, only those aspects of these circuits that are salient to the invention will be discussed hereinafter.

I/O circuitry 210 is electrically connected through path $20_1$ to packet network 50, and in conjunction with communications software routines executing within processing element $10_1$, undertakes packet communication through this network with other processing elements. The communication sub-system routines and the associated I/O circuitry form a communications sub-system that executes as a task within the processing element to handle inter-processing element packet communication. This communication entails for transmission: copying needed application data from an originating application data memory, properly assembling packets to contain appropriate protocol headers (with routing information and application identification information), data and trailer information (e.g. message delimiters and the like) and launching these packets into network 50; and for reception performing appropriate validity and error checks on each incoming packet and, for a valid packet, extracting the data contained therein and informing the corresponding application of the arrival of this data and copying that data into a destination application data memory.

Memory 230, which illustratively may be implemented using random access memory (RAM), contains a linear sequence of physical memory locations, a portion of which is shown in memory map 250. For processing element $10_1$, this memory stores an application program in memory locations λ through n, communications sub-system software routines 260 in locations n through o, and operating system 262 in locations o through p. As thusfar described, this software arrangement is conventionally used in most microprocessor based massively parallel processing systems.

In accordance with our inventive teachings, and as will be discussed in detail below, the application software is modified to include not just the application program itself, at a high level, e.g. high level application program 252 situated in locations l through m, but also our inventive low level application interface, the latter being stored in locations m through n. Together, high level application program 252 and low level application interface 254 form application layer 255. Operationally speaking, our inventive application interface when used, as discussed below, in conjunction with the communications sub-system and the high level application program, advantageously transfers application data of arbitrarily varying strides through the communications sub-system, and between separate processing elements, without the need to pass this data through intermediate I/O buffers therein.

Presently, with conventional massively parallel processing systems such as that described above, data transfers can exact significant penalties in system performance, physical system size and cost. The reason for this is, as conventionally taught in the art, communications sub-systems (or the application programs themselves) rely on copying all outgoing data for a given message from application data memory into an input buffer prior to transmission and, during reception, copying all the data in an incoming message from an output buffer into application data memory. While each of these buffers is organized in stride one memory, i.e. each data location consecutively and sequentially follows a prior location with no gaps therebetween, the underlying data formed by a transmitting application program as well as that to be used by a recipient application program is rarely organized as stride one data. In fact, application data is generally organized and stored with an arbitrarily varying (even complex) stride. Furthermore, these arbitrary variations can differ widely from one application at one processing element to the same as another application but at a different element.

As a consequence, prior to transmission, all the data that is to be transmitted by an transmitting application to a destination (recipient) application must first be "gathered" from diverse memory locations, and at whatever varying stride with which that data is stored, and copied as stride one data into an output buffer contained within the communications sub-system. Similarly, upon reception, the received data contained in the packet must first be converted from its stride one organization and selectively copied, specifically distributed or "scattered", into the destination application data memory with whatever arbitrarily varying stride the destination application and/or that application data memory requires.

Unfortunately, valuable processing time, which can best be spent in increasing application throughput, is instead consumed as overhead in performing these "gather" and "scatter" operations. In fact, depending upon the nature of the arbitrary variations in the memory stride, a significant amount of processing time can be consumed in merely calculating the proper memory address for each successive data item. If a large amount of data, the processing time devoted to performing these calculations can seriously diminish application throughput and inject substantial latency into the processing throughput of the entire processing system. Furthermore, the inclusion of I/O buffers increases the circuit complexity and hence cost and size of each processing element as well as that of the entire system.

To fully appreciate the deficiencies attendant with conventional transfer, on an inter-processing element basis, of data with arbitrarily varying strides, the discussion will first address the concept of data stride. Thereafter, we will specifically describe a protocol which is conventionally used to transfer data between separate processing elements. Having done so, we will then describe our inventive protocol for handling such transfers but without the need to pass this data through I/O buffers along with the extension of our inventive protocol to data filtering and truncation.

B. Memory Strides

Consider, for the moment, N-by-n matrix 300 shown in FIG. 3. This matrix (with N columns and n rows), of which only a portion is shown, contains illustrative matrix elements $300_{0,0}$, $300_{1,0}$, $300_{2,0}$, ..., $300_{N,1}$ in row zero and elements $300_{0,0}$, $300_{0,1}$, $300_{0,2}$, $300_{0,3}$, ..., $300_{0,n}$ in column zero. If the data is stored in column-wise fashion, one column after another with each succeeding data element in any column immediately following its preceding element in that column; then given any one data element, such as element $300_{0,1}$, the next successive element, e.g. $300_{0,2}$ is reached simply by incrementing the address of the former element by one. As such, accessing data elements along any one column, such as column zero, occurs by successively incrementing the memory address of the first data element by one. As such, each column is said to be stride one. Of course, data can be organized with a constant non-one stride. Again, in the case of matrix 300 with its column-wise storage, accessing successive elements in a given row, such as accessing element $300_{1,0}$ then matrix element $300_{2,0}$, entails skipping over n separate memory locations, i.e. the length of a column. Hence, in order to access matrix element $300_{2,0}$ from element $300_{1,0}$, a memory address increment of n locations must be added to the address of the former element in order to arrive at the latter element. Inasmuch as each column has the same length, i.e. n locations, each of the N columns, is said to be stride n.

In contrast, consider N-by-n matrix 400 shown in FIG. 4. Assume that matrix 400, like matrix 300, is also stored in column-wise fashion. Matrix 400 is a sparse matrix formed of non-zero diagonal data elements $X_{0,0}$, $X_{1,1}$, $X_{2,2}$, $X_{3,3}$, ..., $X_{N-1,n-1}$ and off-diagonal non-zero elements $X_{N-a,n-b}$ and $X_{0,n}$. In contrast to matrix 300, which has a constant and regular stride of one or n in the vertical and horizontal directions, respectively, matrix 400 has a varying stride. The address increment, and hence memory stride, associated with accessing element $X_{2,2}$ from element $X_{1,1}$ and accessing element $X_{1,1}$ from element $X_{0,0}$ is constant and regular. However, the address increment associated with accessing element $X_{N-a,n-b}$ from element $X_{2,2}$ is not necessarily equal to that associated with accessing element $X_{2,2}$ from element $X_{1,1}$. Similarly, the stride associated with accessing element $X_{0,n}$ from element $X_{N-a,n-b}$ can be different from the stride associated with any previous element in this matrix. Thus, as successive elements in matrix 400 are accessed, the stride associated with these elements varies depending upon which element is being accessed.

Furthermore, to complicate matters, data can often possess a so-called "complex" stride (though not explicitly shown in matrix 400) in which the stride is a function of the stored data values and/or the corresponding memory addresses themselves. Therefore, in order to access data having a complex stride, the memory increment for a next successive data element may need to be determined as a function of the memory address and/or actual data value for that of an immediately preceding data element. As one can now appreciate, processing time is expended in determining the proper address increment, which, particularly in the case of complex strides and/or for large data transfers, can engender a significant amount of overhead. Both arbitrarily varying and complex strides present the same deficiencies in conventional data message handling. However, since the drawbacks associated with transferring data having either of these strides are advantageously eliminated through our present invention, then, for ease of reference, both of these strides will be collectively referred to hereinafter as simply arbitrarily varying strides.

C. Conventional Inter-processing Element Data Communication Protocol

Essentially, as noted above, conventional data transmission in a massively parallel processing system relies on a communications sub-system to copy all application data, that is to be transmitted from application data storage at an originating processing element to application data storage at a destination processing element, into a stride one output buffer at the former element. This copying entails successively "gathering" all the individual portions of this data, regardless of the stride with which each portion is stored, into this stride one buffer, one portion immediately following another. The starting memory address and length to access each such portion is determined and supplied by the application program at the originating element. Thereafter, the communications sub-system at the originating element forms a single packet containing all this data and then transmits this packet through the packet network to a destination processing element.

Similarly, though basically reversed, in conventionally receiving incoming data, a communications sub-system at the destination processing element copies all this data into a stride one input buffer. Once this copy is complete, the communications sub-system distributes ("scatters") successive portions of the data from the buffer and at an arbitrarily varying stride into local application data memory. The application program executing at the destination element supplies the starting memory address and length for each such portion that is to be locally stored thereat. The originating and destination elements usually store the same data but at different arbitrarily varying strides; the size of each of the portions can also differ between the originating and destination elements.

FIG. 5 depicts a conventional message control block (MCB), e.g. MCB 500, and its constituent fields. As shown, MCB 500 contains three separate fields: protocol header 510, data pointer 520 and complete callback 540. Protocol header 510 contains length field 520, which specifies the total length in bytes of all the data that is to be transmitted or is to be received, as well as a number of other fields (all not shown to simplify the figure) that specify (typically by way of a routing header) the particular processing element for which this data is destined and the particular application executing thereat which is to obtain this data as well as the processing element and application from which this data originates. For transmission, data pointer 530 contains an address in the originating application data memory of the first memory location of the data that is to be transmitted. For reception, this data pointer contains an address of the first memory location in the destination application data memory at which this data is to be stored. Complete callback field 540 contains a pointer to an instruction, which, when execution is passed, implements what is commonly referred to as an "exit", back to a calling (here an application) program immediately upon completion of packet communication operation. In particular, if a data packet is to be transmitted, this exit is a so-called "transmit complete exit" which effectively informs the originating application program that the communications sub-system has successfully transmitted this packet. Alternatively, if a data packet is to be received, this exit is a so-called "receive complete exit" which effectively informs the destination application program that the entire data packet has been successfully received. When execution is passed through either exit, this signifies that a current communications task invoked by an application program has successfully terminated thereby allowing that application program to invoke another task.

FIG. 6 depicts, in high level block diagram form, the processes that are utilized to implement the conventional protocol within each processing element, e.g. element $10_1$, for handling inter-processing element data transfers. As shown, these processes include application program 610 in conjunction with communications sub-system 620, the latter including I/O buffers 630. Separate input and output buffers (both are not specifically shown in this figure) are used to hold copies of incoming and outgoing message data, respectively. To reduce the burden on memory 230 (see FIG. 2) and thus increase processing throughput of each processing element, these buffers are usually dedicated high speed hardware buffers that are distinct from program and data storage areas contained within physical memory 230 associated within each processing element. As symbolized by lines 615 shown in FIG. 6 and as discussed above, the conventional communication protocol relies on bi-directional interaction between application program 610 and communications sub-system 630. This interaction is exemplified by the issuance of MCB 500 (see FIG. 5 and discussed above) by the application program to the communications sub-system; providing starting address and length information to the communications sub-system by the application program; and, upon successful completion of a communications operation, issuance of a complete callback by the communications sub-system to invoke a suitable exit operation within the application program.

Figure 7:
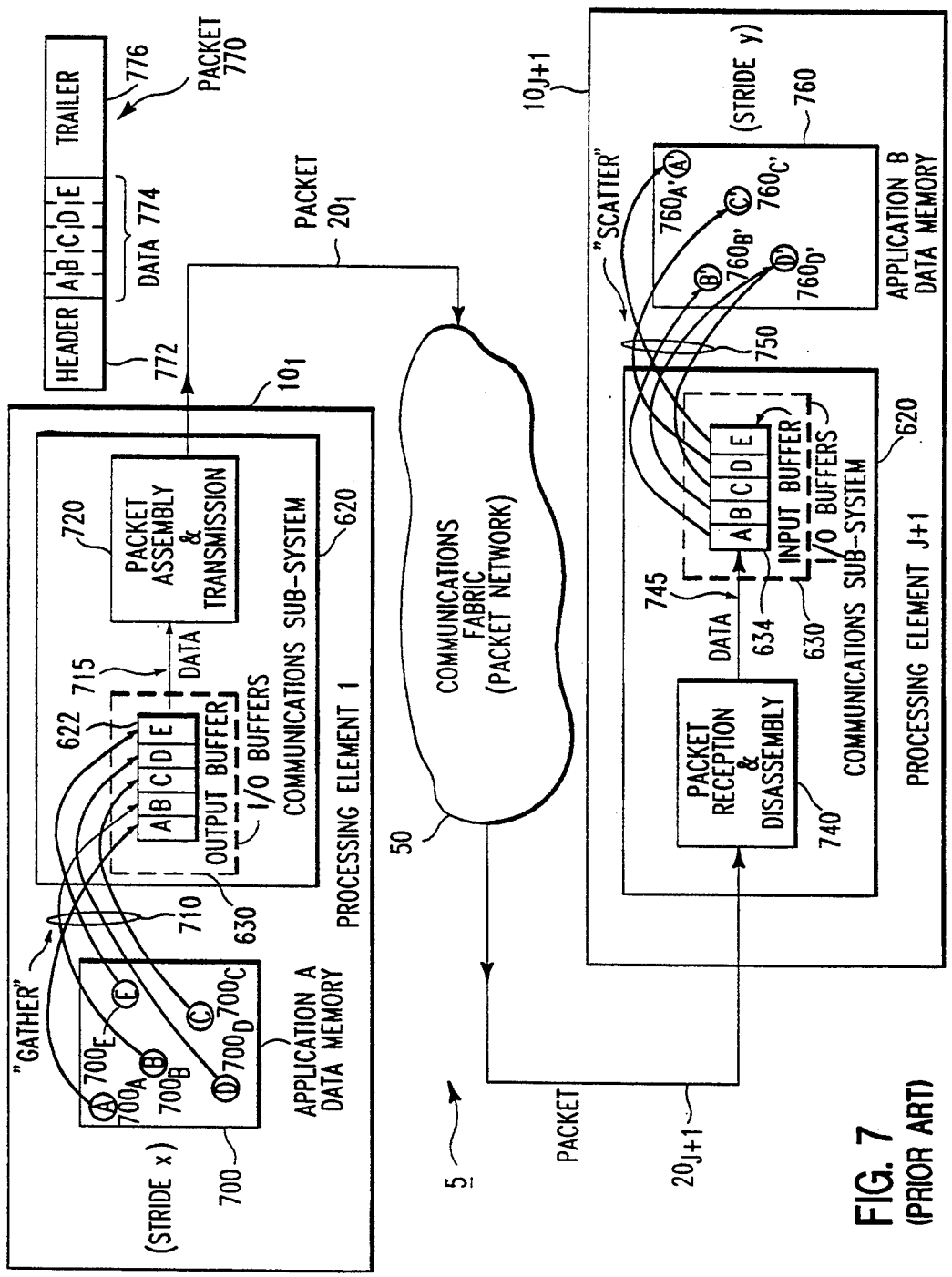
FIG. 7 depicts a high level system block diagram of the methodology through which illustrative data of arbitrarily varying stride is conventionally transferred, through packet communication, from one processing element, e.g. element $10_1$, to another, e.g. element $10_{J+1}$, within system 5 shown in FIG. 1.

With the above in mind, FIG. 7 depicts a high level system block diagram of the methodology through which illustrative data of arbitrarily varying stride is conventionally transferred within system 5, through packet communication, from one processing element, e.g., element $10_1$, to another element, e.g., element $10_{J+1}$.

For purposes of illustration, assume application program A executing within processing element $10_1$ seeks to transfer data, i.e. illustratively portions A, B, C, D and E, currently stored in five disparate memory areas, i.e. corresponding storage areas $700_A$, $700_B$, $700_C$, $700_D$ and $700_E$, within application A data memory 700 to application B data memory 760 situated within processing element $10_{J+1}$ for subsequent use by application program B. Though not explicitly shown, the application data memory for each processing element is contained within the physical memory, i.e. memory 230 shown in FIG. 1, located within that element. As shown in FIG. 7, these data portions are stored with an arbitrarily varying, and hence non-constant and irregular, stride (e.g. stride x). In order to transfer this data from processing element $10_1$, application program A determines the starting address at which each portion of this data is stored and the length of each such portion. This address and length information is passed to communications sub-system 620 which, in turn, accesses each portion of this data (often collectively stored as a linked list) and reads that portion into successive locations within stride one output buffer 632 situated within I/O buffers 630. This entire operation of first determining memory starting addresses and data lengths and then copying, on a one-for-one basis, each data portion from memory 700 into a corresponding portion of output buffer 632, performs the so-called "gather" operation symbolized by lines 710. As a result, these five disparately located data portions are copied in succession one after another within output buffer 632, so as to be collectively organized as stride one data. Once all the data that is to be transmitted (here consisting of data portions A-E) to processing element $10_{J+1}$ has been copied into output buffer 632 as stride one data, communications sub-system 620, through well-known packet assembly and transmission process 720 that forms part of this sub-system, takes, as symbolized by line 715, the data and constructs an appropriate message packet, containing all this data as well as appropriate header and trailer information, and then transmits that packet, via path $20_1$ into communications fabric 50.

The general form of the message packet carried through the communications fabric is shown by packet 770. This packet contains three basic fields: header field 772, data field 774 and trailer field 776. Header field 772 itself contains various fields (all of which are conventional and not shown) that specify, inter alia, the destination processing element and the application executing thereat for which the data contained in the packet is destined as well as the processing element and application program from which this data originates. Data field 774 contains all the data that is to be transmitted between application program A and application program B, here consisting of data portions A-E arranged in a stride one organization. Trailer information 776 contains various fields (again all of which are conventional and not shown) that contain, inter alia, various message delimiters and fields used for error correction.

Packet 770 is then transported through communication fabric 50 to processing element $10_{J+1}$. Upon its arrival, packet reception and disassembly process 740, which also forms part of communications sub-system 620, performed with element $10_{J+1}$, extracts all the data contained in the packet. For purposes of simplifying the present discussion, assume this data was solicited by application program B in which case incoming packet 770 will not be temporarily stored by the communications sub-system until its data is requested by this application. Hence, for solicited data, the data extracted from packet 770 will be copied into stride one input buffer 634 located within I/O buffers 630 utilized by communications sub-system 620. Once all the data (here data portions A-E) contained within the incoming packet has been copied into stride one input buffer 634, application program B effectively partitions that data into whatever portions this application requires, here four portions shown as A', B', C' and D', by determining the starting memory address for each portion of this data and the length of each such portion. Thereafter, application program B supplies this address and length information to the communications sub-system, which, in turn, stores each of these portions, on a one-for-one basis, within corresponding memory areas $760_A'$, $760_B'$, $760_C'$ and $760_D'$ with whatever stride (e.g. arbitrarily varying stride y, with y generally unequal to x) this application is now using (with this data often being collectively stored as a linked list). This partitioning and storage operation is the so-called "scatter" operation and is symbolized by lines 750. Similar, though opposite to a gather operation, a scatter operation collectively involves calculating both a starting memory location in application B data memory and a length of each individual data portion (A' through D') and then copying that portion into the corresponding storage area within the application B data memory.

Thus, as one can now readily appreciate, in the conventional data transfer protocol, only one packet 770 is used to transmit all the data from an originating processing element to a destination processing element with the concomitant need to convert the data, through two copying operations using stride one output and input buffers, from whatever arbitrarily varying stride the data is in at the former element into whatever arbitrarily varying stride is required by the application program at the latter element.

Figure 8:
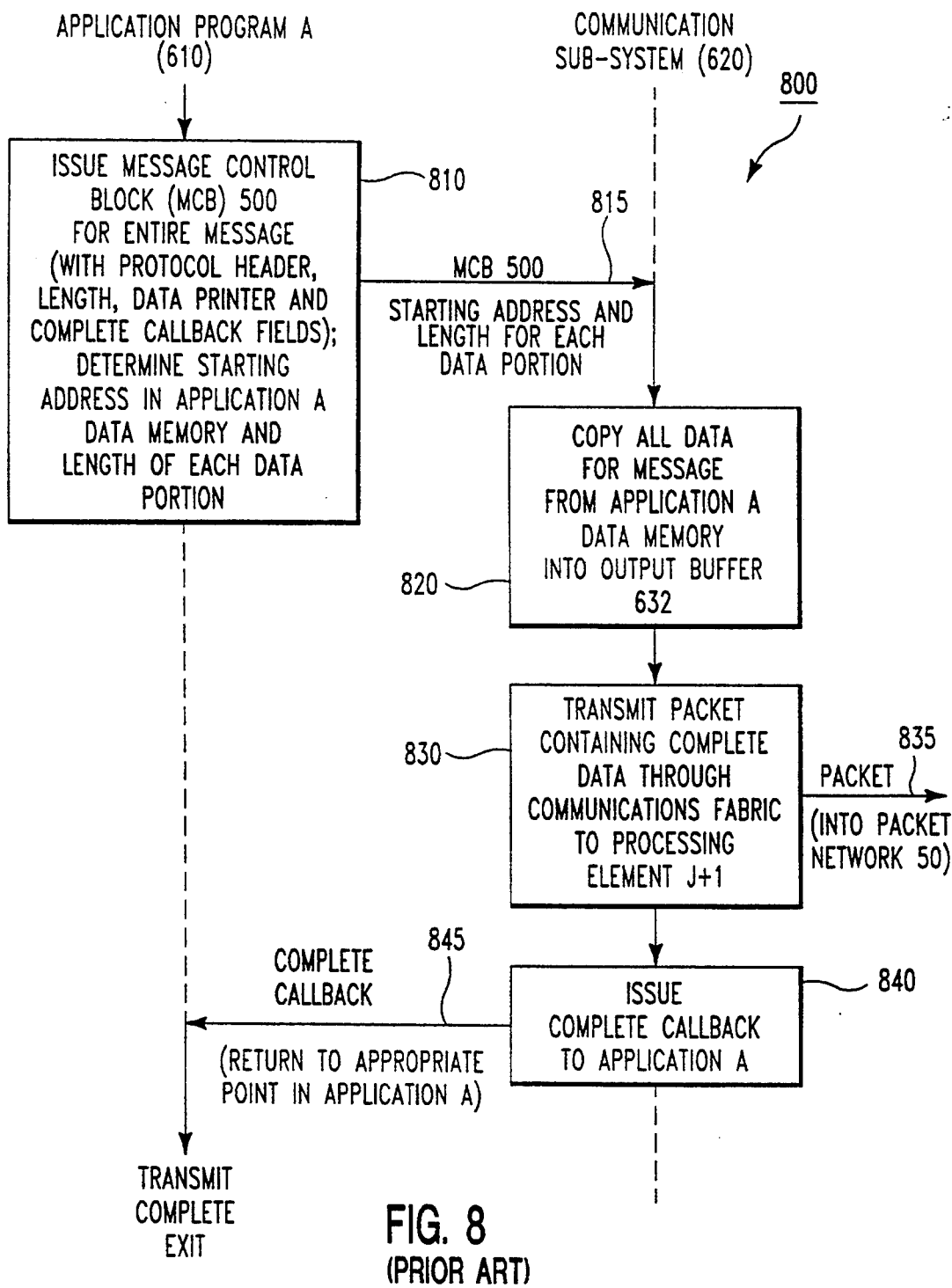
FIG. 8 depicts a high level functional block diagram of a conventional protocol for inter-processor data communication and particularly portion 800 of that protocol operating within illustratively processing element $10_1$ for transmitting application data of an arbitrarily varying stride from that element to another such element, e.g. element $10_{J+1}$, within system 5.

To solidify understanding, FIGS. 8 and 9 depict this conventional protocol from a functional perspective for both data transmission and reception.

Specifically, FIG. 8 depicts a high level functional block diagram of this conventional protocol, and specifically portion 800 thereof for transmitting application data from and associated with application program A executing within processing element $10_1$ to application program B executing within processing element $10_{J+1}$.

As depicted, to transmit data, application program A (which generally can be viewed as application program 610 shown in FIG. 6) first issues, as symbolized by block 810, conventional message control block (MCB) 500. Application program A inserts appropriate entries into the protocol header, length, data pointer and complete callback fields (see FIG. 5). The length field is completed with a byte count of the length of the entire data to be transmitted. The remainder of the protocol header is completed to, inter alia, identify the originating and destination processing elements, here elements $10_1$ and $10_{J+1}$, respectively, and the application program from which the data originates and for which it is destined, here application programs A and B, respectively. Thereafter, as shown in FIG. 8, application program A issues, as symbolized by line 815, MCB 500 to the communications sub-system. In addition, application program A determines all the starting locations and lengths for each disparately stored stride one portion of the data. In response, communications sub-system 820 copies all the data portions from application A data memory into stride one output buffer 632. Thereafter, the communications sub-system, as indicated by block 830, constructs a data packet containing the data and transmits that packet through the communications fabric to destination processing element $10_{J+1}$. Once the packet has been successfully transmitted, the communications sub-system issues a complete callback to application program A, i.e. execution is returned to an instruction within this application program situated at an address specified in the complete callback field of MCB 500. As such and as symbolized by line 845, the complete callback results in a transmit complete exit from the protocol.

FIG. 9 depicts a high level functional block diagram of this conventional protocol, as undertaken within processing element $10_{J+1}$, and specifically portion 900 of this protocol for receiving application data transmitted by application program A executing within processing element $10_1$ and destined for application program B executing within element $10_{J+1}$.

As depicted, to solicit data, application program B (which generally can also be viewed as application program 610 shown in FIG. 6) first issues, as symbolized by block 810, message control block (MCB) 500. Application program B inserts appropriate entries into the protocol header, length, data pointer and complete callback fields (see FIG. 5). The length field is completed with a byte count of the length of the entire data that is to be received. The remainder of the protocol header is completed to, inter alia, identify the originating and destination processing elements, here elements $10_1$ and $10_{J+1}$, respectively, and the application program at which the data originates and that which is to receive the data, here application programs A and B. Thereafter, as shown in FIG. 9, application program B issues, as symbolized by line 915, MCB 500 to the communications sub-system. In addition, application program B effectively partitions the incoming data into whatever arbitrarily varying stride the application requires by first determining all the starting locations and lengths for each separate stride one memory area into which a corresponding portion of this data is to be written. Thereafter, the communications sub-system receives the data packet as depicted by block 920, and then copies, as depicted by block 930, the data, portion by portion as specified by application program B, from stride one input buffer 634 into disparate and corresponding stride one storage areas within application B data memory. Once the entire packet has been completely received and all its data copied into application B data memory, the communications sub-system issues, as depicted by block 940, a complete callback to application program B, i.e. execution is returned to an instruction within this application program situated at an address specified in the complete callback field of MCB 500. As such and as symbolized by line 945, the complete callback results in a receive complete exit from the protocol.

D. Inventive Inter-processing Element Data Communication Protocol

As discussed above, the conventional protocol inherently restricts all the application data, that is to be communicated between two processing elements, to be transferred through one single packet. This, in turn, necessitates that all this data be passed through two separate stride one I/O buffers (an output buffer for transmission and an input buffer for reception) such that the data can be communicated in this one single packet. As such, all this data must be converted for transmission, through a "gather" operation with copying into the output buffer, from one arbitrarily varying memory stride into stride one and then, upon reception, through copying and a "scatter" operation, converted from stride one into another arbitrarily varying memory stride. By virtue of this operation, a substantial amount of processing time can be consumed in performing "gather" and "scatter" operations, particularly for calculating starting addresses for use therein. This, in turn, decreases the application throughput provided by each processing element and hence by the entire processing system. Moreover, this protocol requires the use of I/O buffers which add complexity, space and cost to each processing element and to the entire system as a result, and due to their limited capacity can, where a substantial amount of data is to be transferred, limit system throughput.

Advantageously and in accordance with our present invention, we have developed a communications protocol particularly useful for inter-processing element data transfers, while based upon the conventional protocol eliminates all the deficiencies associated therewith.

Specifically, our inventive protocol relies on transferring application data not in just one but rather in a succession of packets, where each packet contains a partial data message. Each partial data message contains a stride one portion of the data that is stored in an originating application data memory. An application interface, which also forms part of our inventive protocol, locally determines the starting location and length of each separate data portion. The interface then provides this information to the application program which, in turn, suitably updates our inventive message control block (which will be discussed in detail below).

Generally speaking, our inventive message control block contains two additional fields, i.e. "pending callback" and "pend size", both of which are not present in a conventional message control block. For each partial message, the pend size specifies the length of the data contained just within that message. The pending callback contains an pointer to the first instruction in the application interface.

For message transmission, our inventive interface utilizes an application data specific sending filler function (hereinafter also referred to as $\Phi_S$) to determine the starting location and size of each data portion stored in a corresponding stride one area of the originating application data memory. After each partial message is constructed and transmitted as a separate packet, the communications sub-system determines whether any data portions remain to be transferred, hence whether any further partial messages need to be transmitted. If so, the pending callback is used to return execution, in the form of a "transmit pending exit", to the application interface to determine the starting location and data length for the next data portion, and then, through the communications sub-system, read that data portion, and finally construct and transmit a packet containing that data portion, and so on for all remaining data portions. Alternatively, if a partial message containing the last data portion has been transmitted, the communications sub-system invokes the complete callback to establish a transmit complete exit.

For message reception, our inventive protocol functions in a highly similar, though essentially reverse manner. Specifically, our inventive application interface utilizes a receiving filler function (hereinafter also referred to as $\Phi_R$) to determine, based upon requirements of the destination application, the starting location and length of a corresponding memory area in the destination application memory within which a data portion in an incoming partial data message is to be stored. This information is provided by the destination application program which updates our inventive message control block, that initiated the receive operation, by setting the pend size equal to the length and the data pointer to the starting location. The updated MCB is then provided to the communications sub-system which, upon subsequent receipt of this partial data message, merely writes the data portion contained therein into the memory area at the starting address and for the specified length. After each partial message is received, the communications sub-system determines whether any data portions are missing, i.e. whether any partial messages still remain to be received. If so, the pending callback within our inventive MCB is used to return execution, in the form of a "receive pending exit", to the application interface to determine the starting location and data length for the next data packet, and then, through the communications sub-system, extract that data portion from the next incoming packet and merely write that portion into the proper area in the destination application memory, and so on for all remaining data portions. Alternatively, if a partial message containing the last data portion has been received, the communications sub-system invokes the complete callback to establish a receive complete exit.

Hence, our inventive communications protocol transfers application data from an application memory to another, even if the memory strides are arbitrarily varying and different, without the need to pass the data through intermediate I/O buffers. Thus, these I/O buffers can be advantageously eliminated with concomitant savings in circuit complexity, physical size and cost in each processing element and the overall system. Moreover, by eliminating the processing overhead otherwise required to copy application data through these buffers, application processing throughput for each processing element and hence of the entire system can significantly increase.

We will now specifically discuss our inventive protocol by first describing the processes that implement our protocol in each processing element; followed by describing our inventive message control block and finally by separately describing the functional operations that occur during use of our protocol for transmission and reception of application data. Inasmuch as any particular embodiment of our inventive protocol, i.e. the particular low level coding and the specific software routines used therewith, are implementationally dependent and hence may vary greatly from one processing environment to the next, and from the following discussion would certainly be readily apparent to anyone skilled in the art for any of these environments, then, for purposes of simplicity, we will limit our discussion to a relatively high level.

FIG. 10 depicts, in high level block diagram form, those processes that are utilized to implement our inventive protocol within each processing element, e.g. element $10_1$, for handling inter-processing element data transfers of an arbitrarily varying stride. As shown, these processes include application layer 255 which itself contains (high level) application program 252, application interface (low level) 254 (also shown in FIG. 2 as residing within physical memory 230); and, as shown in FIG. 10, communications sub-system 1030, the latter similar to communications sub-system 620 (see FIG. 6) but now not containing any I/O buffers. As symbolized by lines 1015 and 1025 shown in FIG. 10 and as discussed above, our conventional communication protocol relies on bi-directional interaction between application program 252, application interface 254 and communications sub-system 1030. This interaction is exemplified by the issuance and successive updating of our inventive MCB 1100 (see FIG. 11 and discussed below) by the application program to the communications sub-system; providing through the application interface starting address and length information to the communications sub-system for each data portion; and, upon successful completion of a communications operation, issuance of a complete callback by the communications sub-system to invoke a suitable exit operation within the application program.

FIG. 11 depicts our inventive message control block (MCB) 1100 and its constituent fields. As shown, MCB 1100 contains five separate fields: protocol header 510 with embedded length field 520; data pointer 530; complete callback 540; pending callback 1110 and pend size 1120. Inasmuch as fields 510, 520, 530 and 540 have all been fully described above and provide the identical functions as stated therein, only additional fields 1110 and 1120 will now be discussed.

As noted, pending callback field 1110, similar in overall function to complete callback field 540, contains a pointer which, when executed, implements an "exit" back to a calling program. In the case of a pending callback, the exit (as discussed in detail below in connection with FIGS. 12A and 12B, and 13A–13D) is to the application interface to compute a starting address and length for the next data portion to either be transmitted or received through a partial data message. Pend size field 1130 contains the length of the next data portion, in bytes, that is to be transmitted or received as the partial message.

Figure 12A:
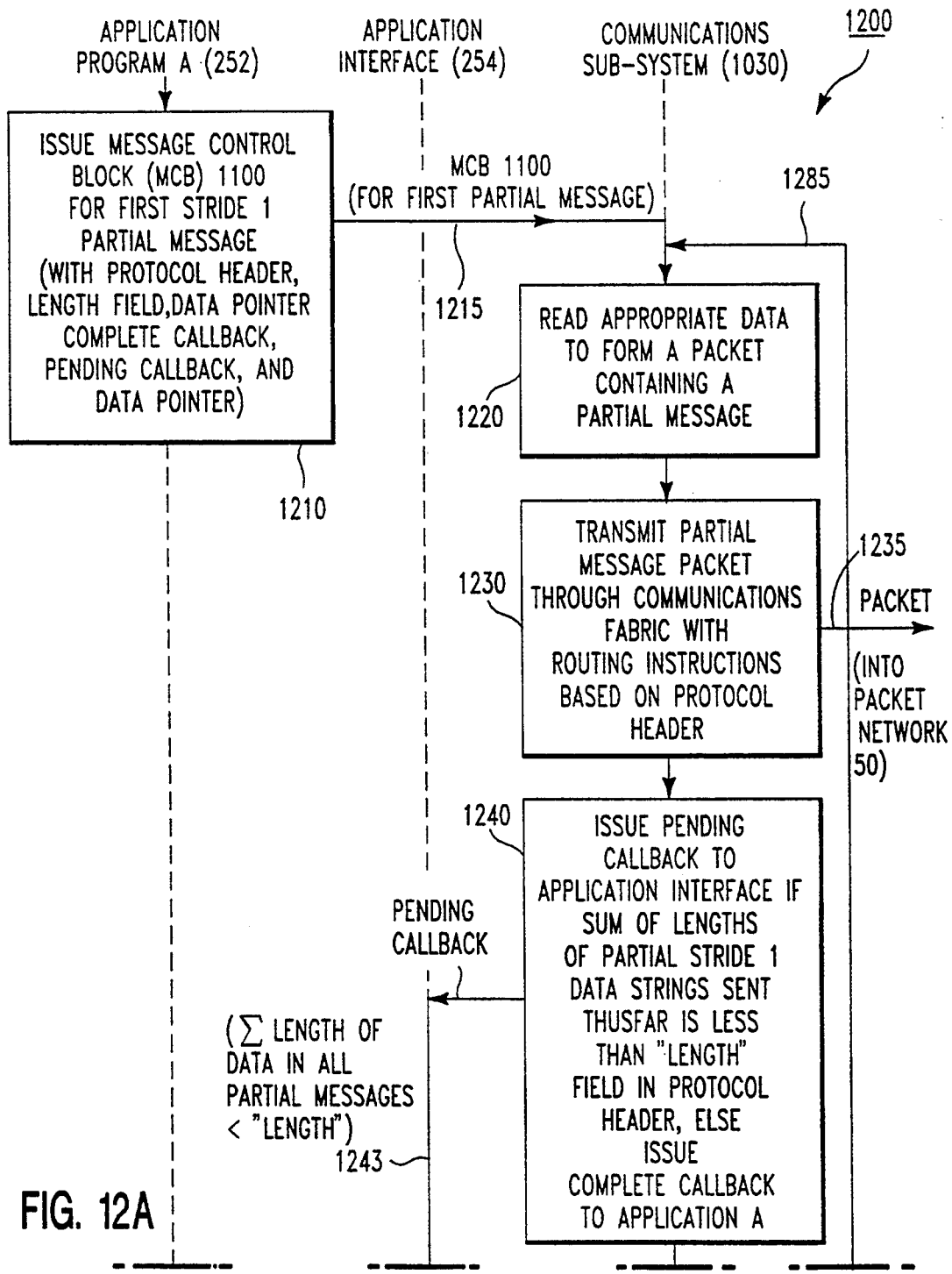
FIGS. 12A and 12B collectively depict a high level functional block diagram of our inventive protocol for inter-processor data communication and particularly portion 1200 of that protocol operating within illustratively processing element $10_1$ for transmitting application data of an arbitrarily varying stride from that element to another such element, e.g. element $10_{J+1}$, within system 5.
Figures 12, 12B:
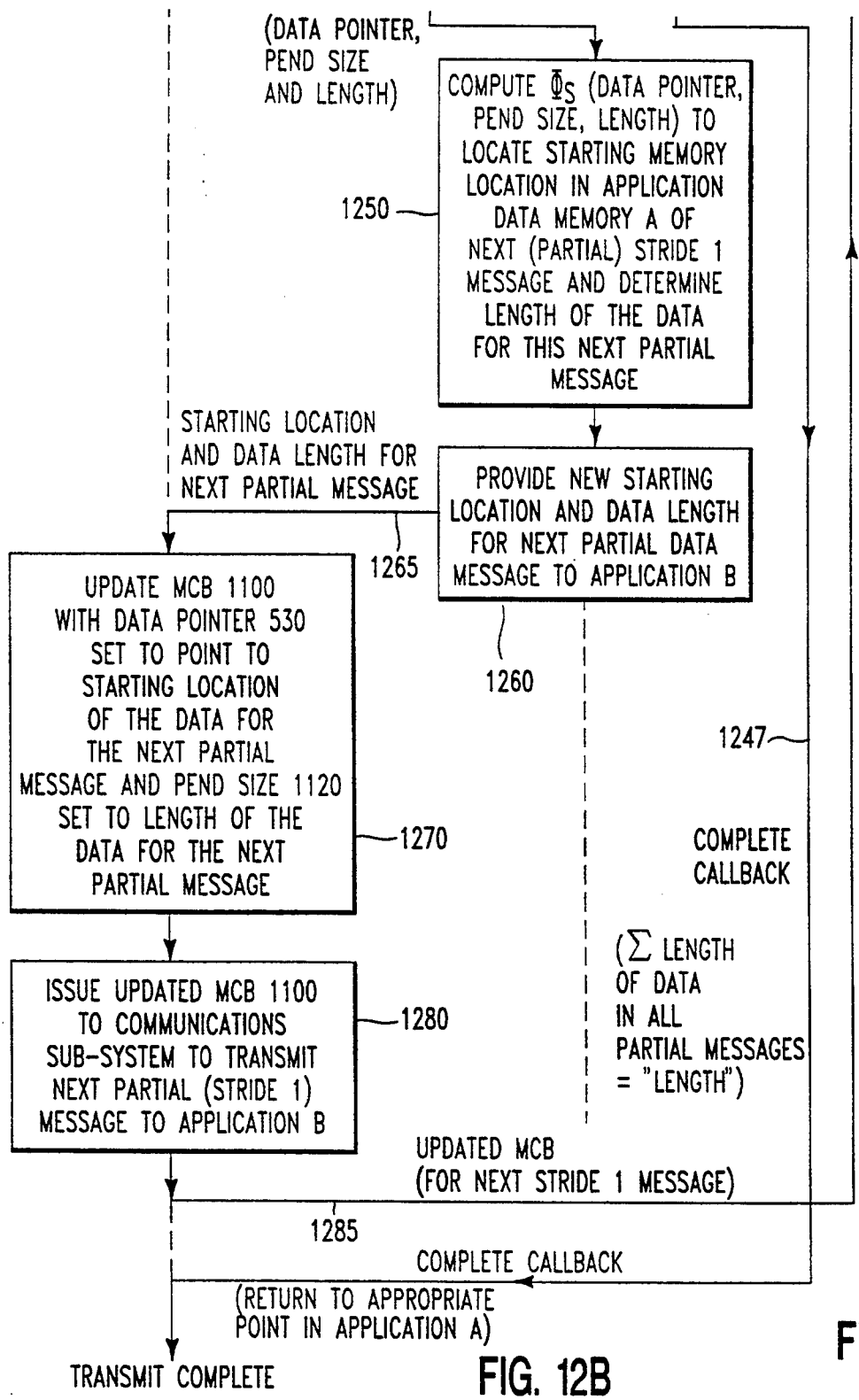
FIG. 12 depicts the correct alignment of the drawing sheets for FIGS. 12A and 12B.

FIGS. 12A and 12B collectively depict a high level functional block diagram of portion 1200 of our inventive protocol, operating within illustratively processing element $10_1$, for transmitting application data of an arbitrarily varying stride from that element to another such element, e.g. element $10_{J+1}$. The correct alignment of the drawing sheets for these figures is depicted in FIG. 12.

As depicted, to transmit data, application program A (which generally can be viewed as high level application program 252 shown in FIGS. 2 and 10) first issues, as depicted by block 1210, message control block 1100 for the first stride one data portion of the data that is to be transmitted. In this regard, application program A completes the protocol header, including the embedded length field, for the entire message, i.e. the protocol header is appropriately set to specify the originating and destination processing elements and the application programs thereat; the length field is set to specify the byte-wise length of all the data that is to be transmitted. The data pointer is set to point to the starting memory address in application A data memory for a first data partial that is to be transferred. Specifically, the entire data, organized with an arbitrarily varying stride, is stored as a series of so-called "data partials". Here, each such data partial is a stride one portion of the data. The complete callback field is also properly set to invoke a transmit complete exit. Through the course of generating each successive partial data message to transport each successive stride one data portion through the communications network, the same protocol header will be repeatedly used by communications sub-system 1030 to construct the associated data packets, and particularly the header portions of each of these packets. As for the first partial data message, the pending callback field is properly set to point to the starting instruction in the application interface; the pend size field is set to specify the byte-wise length of the first stride one data portion. As will be seen, the pending callback field will also not change for each successive partial data message; however, the length field will change based upon the size (in bytes) of the corresponding stride one data portion in application A data memory.

Once the MCB has been issued, as symbolized by line 1215, communications sub-system 1030, as indicated by block 1220, reads the appropriate stride one data portion for the current, in this case first, data partial (i.e. which constitutes the first partial data message) from application A data memory. Thereafter, this sub-system, as depicted in block 1230, constructs and transmits a partial data message packet through the communication fabric with routing instructions based upon the protocol header—the latter operation symbolized by line 1235. Once this packet has been transmitted, the sub-system determines, as depicted in block 1240, whether all the successive stride one data portions that are to form the entire data to be transferred have been transmitted to the destination processing element. To accomplish this function, the communications sub-system maintains a cumulative (running) total of the sum of the lengths of all the individual stride one data portions that have transmitted thusfar for the current data. The length of each such portion is provided through the value of the pend size field. The cumulative total is incremented with this value after the current partial message packet is transmitted into the communications fabric. If the sum of all the stride one data portions that have been transferred equals the byte-wise value of length field in the protocol header, then the communications sub-system issues, as symbolized by line 1247, a complete callback, to invoke a transmit complete exit back to an appropriate point in application program A.

Alternatively, in the event the sum of the pend size fields is less than "length" field in the protocol header, thereby indicating that additional stride one data portions remain to be transferred, then the communications sub-system issues, as symbolized by line 1243, a pending callback which, in turn, transfers execution to the application interface. In this case, the application interface, as indicated by block 1250, computes the sending filler function $\Phi_S$ to determine the starting location in application A data memory for the next stride one data portion as well as the length, in bytes, of that portion. This function, as well as the receiving filler function $\Phi_R$, is highly specific to the data structure being transferred as well as the locations, linkage and variations in stride of its underlying data elements as stored in application data memory. Inasmuch as both of these functions would be readily apparent to anyone skilled in the art and our invention does not lie in the specific functions that are employed in any one instance, the specific functions used will not be discussed in any detail. With this in mind, once the starting location and length for the next stride one data portion have been determined, the application interface, as indicated by block 1260 and symbolized by line 1265, provides this starting location and length information to application program A. Thereafter, application program A updates MCB 1100, as depicted by block 1270, with pend size field 1120 set to the length of the stride one data for the next partial data message and data pointer field 530 set to the starting location for this data portion and supplied by the application interface. Thereafter, as indicated by block 1280, application program A issues, as symbolized by line 1285, the updated MCB back to the communications sub-system to read this next stride one data portion from the application A data memory, and construct and transmit a corresponding partial message packet containing this data portion, and so on for each successive stride one data portion in application A data memory that remains to be transferred from this data memory to application B data memory at destination processing element $10_{J+1}$. Thus, as can be seen, functional interaction occurs, among the communications sub-system, application interface and application program A, through iterative execution of blocks 1220, 1230, 1240, 1250, 1260, 1270, and 1280, to transmit the entire data to the destination processing element as a succession of partial data packets with each of these packets containing a successive stride one data portion from application A data memory.

Figure 13B:
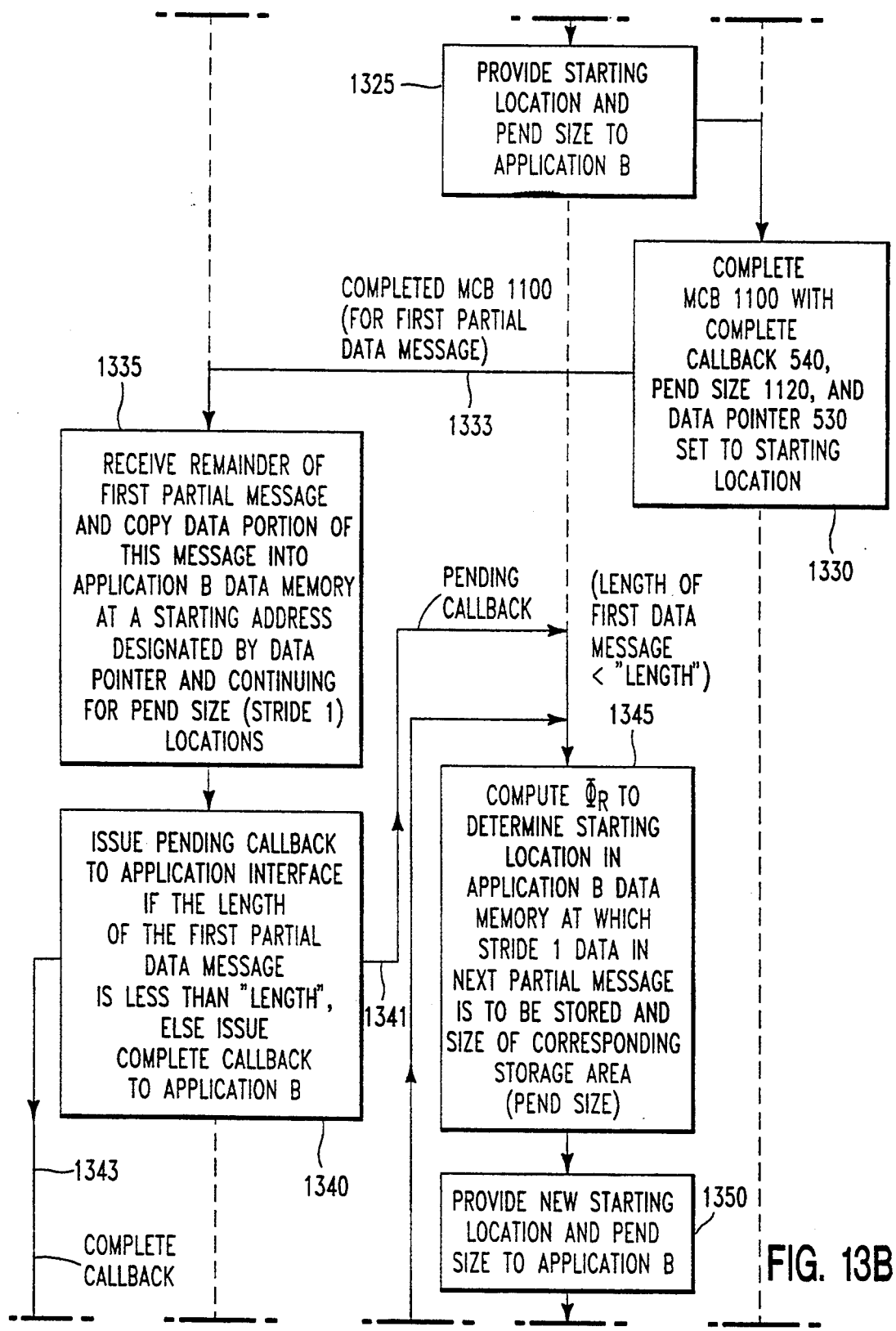
Figure 13C:
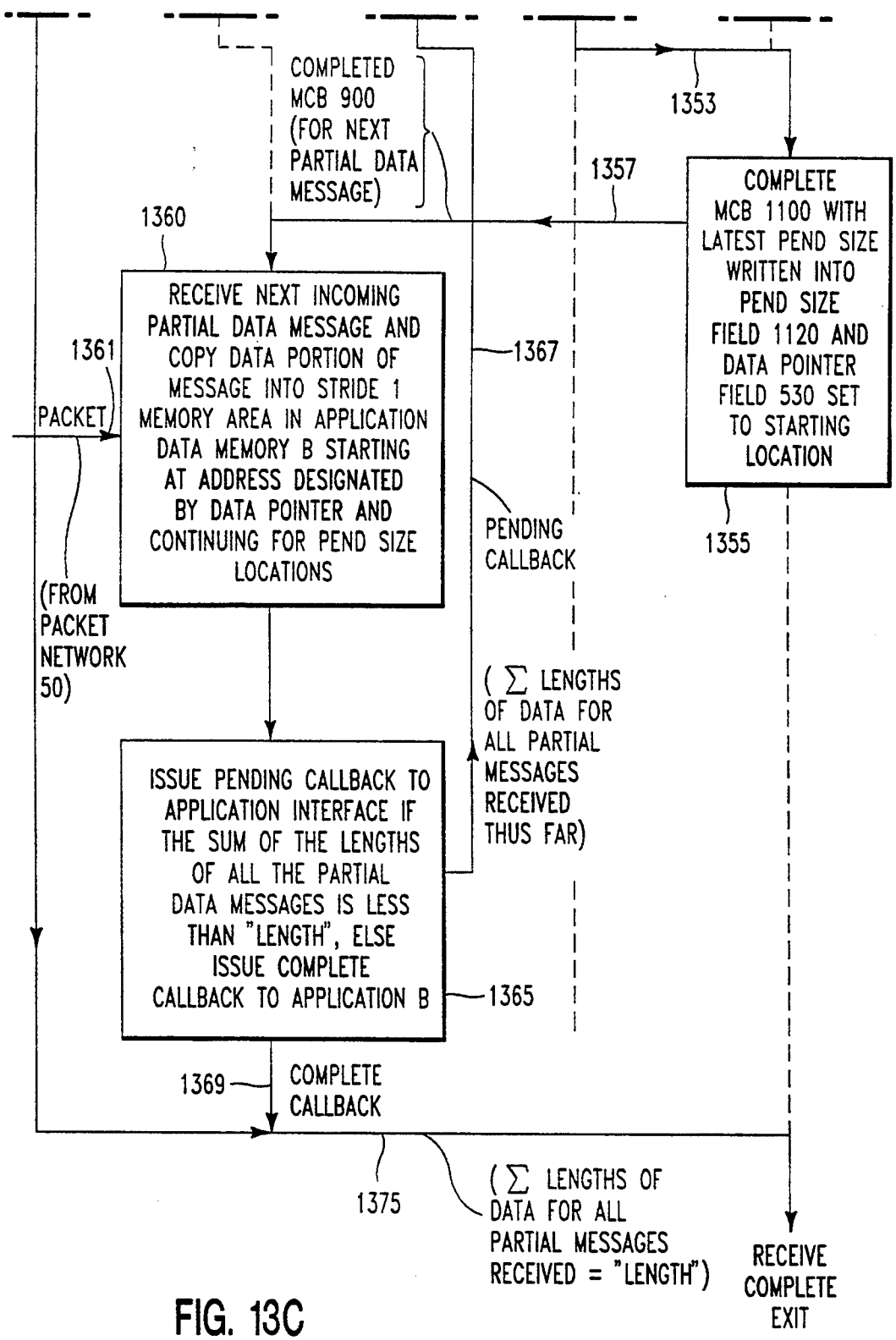

FIGS. 13A-13C collectively depict a high level functional block diagram of portion 1300 of our inventive protocol, operating within processing element $10_{J+1}$, for receiving application data for storage, at an arbitrarily varying stride, from another such processing element, e.g. element $10_1$. The correct alignment of the drawing sheets for these figures is depicted in FIG. 13. The operations associated with receiving application data are similar, though essentially reversed, from those shown in FIGS. 12A and 12B for transmitting application data.

Specifically, for receiving application data from an originating processing element, communications sub-system 1030, as depicted by block 1305, first receives, as symbolized by line 1301, a beginning portion of an incoming partial data packet from packet network 50. This particular packet is a first packet in a succession of data packets from an originating processing element. With a one-for-one correspondence between each partial data packet and a corresponding data portion, this succession can contain as few as one but generally two or more partial data packets. This succession collectively transfers all the application data between these two processing elements. In response to the receipt of a beginning portion of the first incoming partial data packet, the communications sub-system, as depicted in block 1305, extracts the protocol header from this portion of the packet received thusfar. This header, as described above, contains the embedded length field, as well as various sub-fields that specify the originating and destination processing elements and corresponding applications. Once the protocol header has been extracted, the communications sub-system constructs, as depicted in block 1310, a incomplete version, also referred to as a "stub", of message control block 1100. Inasmuch as the only information for this MCB that has been received thusfar is the protocol header, only this field is completed in the stub. All other fields remain nulled. The communications sub-system then issues, as symbolized by line 1313, the MCB stub, as it then stands, to application program B (which generally can also be viewed as high level application program 252 shown in FIGS. 2 and 10).

At this point, since a pending callback, as described below, has not yet occurred, the application itself invokes, as depicted in block 1315, application interface 254 to determine the starting memory location and pend size for the first stride one area in memory for the incoming data portion. As such, application interface 254 initially calculates, as depicted in block 1320, the receiving filler function $\Phi_R$ to point to the beginning of the first stride one area in application B data memory at which the incoming data is to be stored and the size of this area that is available. Note that the size and location of this area are totally independent of the size and location of the stride one data area in application A data memory from which this data portion originated. Once this starting location and size is determined, both of these are passed, as symbolized by block 1325, with the latter as the pend size to application program B. In response to this information, application program B, through the function depicted in block 1330, completes the MCB stub by inserting the complete callback, pend size and data pointer fields therein. The data pointer is set to the starting address value that has just been provided by the application interface. Thereafter, application program B issues, as symbolized by line 1333, now completed MCB 1100 to the communications sub-system to control the transfer of the first data portion into application B data memory.

In response to the completed MCB, communications sub-system 1030, as depicted in block 1335, extracts the first data portion from the remainder of the first incoming partial data message packet. As the data is being extracted, the communications sub-system simply writes this data, without forming an intermediate copy, into the stride one memory area within application B data memory defined by the data pointer and pend size. Of course, depending upon the length of the particular data portion being received, this data may well not fill the entire stride one data area that is available. Hence, incoming data from the next data portion (as well as from other successive portions, if needed) will be used, as specified by the receiving filler function, to successively fill the remainder of this stride one area. In any event, once the current data portion has been written into this stride one area of application B data memory, the communications sub-system determines, as indicated by block 1343, whether all the incoming application data has been written, here as a single stride one portion, into application B data memory. To accomplish this function and similar to that occurring during partial message transmission, the communications sub-system maintains a cumulative (running) total of the sum of the lengths of all the individual stride one data portions that have received thusfar for the current data. The length of each such portion is provided through the value of the pend size field. The cumulative total is incremented with this value after the current partial message packet is written into application B data memory. If the sum of the lengths of all the stride one data portions (here assumed to be one such portion) that have been transferred equals the byte-wise value of length field in the protocol header, then the communications sub-system issues, as symbolized by lines 1343 and 1375, a complete callback, to invoke a receive complete exit back to an appropriate point in application program B.

Alternatively, in the event the sum of the pend size fields is less than the length field in the protocol header, thereby indicating that additional stride one data portions remain to be written in application B data memory, then the communications sub-system issues, as symbolized by line 1341, a pending callback which, in turn, transfers execution to application interface 254. In response, the application interface, as indicated by block 1345, computes the receiving filler function, $\Phi_R$, to determine the starting location in application B data memory of the next stride one data area as well as the length, in bytes, of that area.

Once the starting location and length for the next stride one data area have been determined, the application interface, as indicated by block 1350 and symbolized by line 1353, provides this starting location and length information to application program B. Thereafter, as depicted by block 1355, application program B updates MCB 1100 with pend size field 1120 set to the length of this stride one area that is to store the next partial data message and data pointer field 530 set to the starting location for this data portion and supplied by the application interface. Of course, in the event that the prior stride one data area was not filled with the data portion that was just received, then the data pointer and pend size will be set by the receiving filler function to point to the starting location in the remainder of this area and with the pend size set to reflect the remaining size of this area. In any event, once application program B appropriately updates MCB 1100, the updated MCB is issued, as symbolized by line 1357, to the communications sub-system.

In response to the updated MCB, communications sub-system 1030, as depicted by block 1360, extracts the next data portion from the next incoming partial data message packet. As the data is being extracted, the communications sub-system simply writes this data, without forming an intermediate copy, into the stride one memory area within application B data memory defined by the current values of the data pointer and pend size (so as to form a corresponding data partial). Thereafter, the communications sub-system determines, as depicted in block 1365, whether all the incoming data being transferred has now been written into appropriate successive stride one data portions in application B data memory. To accomplish this, the communications sub-system increments the cumulative total with the pend size for the current portion that has just been written. If the sum of all the stride one data portions that have been written for the current data transfer equals the bytewise value of length field in the protocol header, then the communications sub-system issues, as symbolized by lines 1369 and 1375, a complete callback, to invoke a receive complete exit back to an appropriate point in application program B. Alternatively, if an additional data portion remains to be written, then, block 1365 issues, as symbolized by line 1367, a pending callback to application interface 254 to calculate, as depicted in block 1345, the starting location and length of the next stride one data area in application B data memory into which an incoming stride one data portion originating from application A data memory is to be written, and so on for each such successive incoming data portion. Thus, as can be seen, functional interaction occurs, among the communications sub-system, application interface and application program B through iterative execution of blocks 1340, 1345, 1350, 1355, 1360 and 1365 to receive the entire data at the destination processing element as a succession of partial data packets with the data portion in each of these packets being written into a corresponding stride one area within application B data memory.

Hence, one can now readily appreciate that although the same identical data is being transferred between two application programs A and B, the length of each stride one data area and the number of such areas into which this data is written within application B data memory are totally independent of those used within application A data memory from which the data is read. As such, our inventive protocol can be used to "steer" data partials as required into a destination application data memory, independent of the size of all the data and the stride with which that data is collectively stored in an originating application data memory.

Advantageously, our inventive communications protocol can be readily and easily used to filter out unwanted sections of applications data, prior to its transmission, or truncate incoming applications data upon its reception. Both data truncation and data filtering can be expected to have important applications for very high-performance information filtering processes that manage incoming streams of information, such as database transactions, bibliographic queries, real-time data and others. Consequently, our inventive protocol may be particularly useful in these applications.

Figure 14:
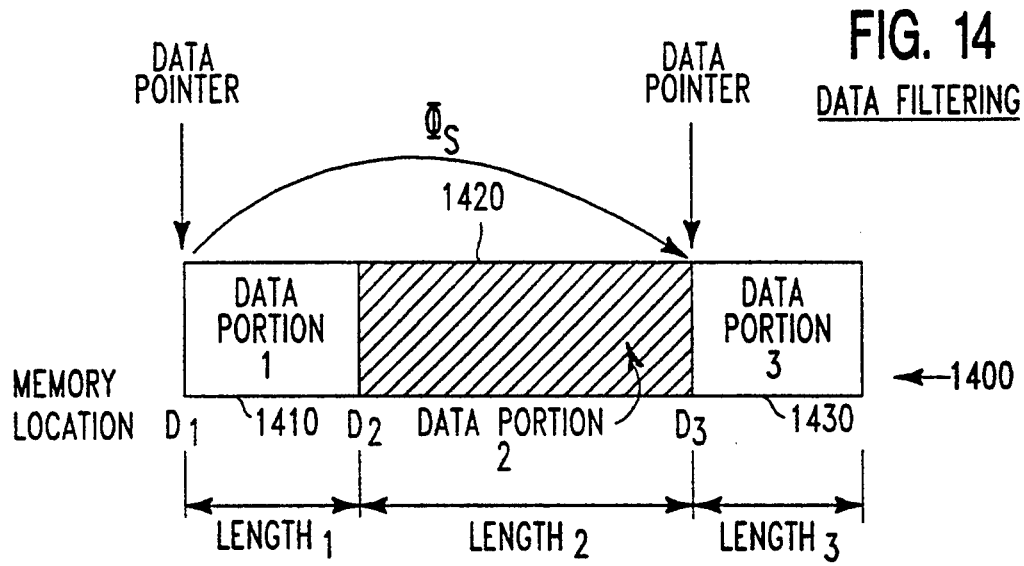
FIG. 14 depicts an illustrative manner through which outgoing data 1400 can be filtered, prior to its transmission, through use of our inventive protocol.

Specifically, FIG. 14 depicts an illustrative manner through which our inventive protocol can be used to filter outgoing data 1400 prior to its transmission. This is accomplished by merely modifying the sending filler function to skip over each unwanted stride one data portion. Specifically, data 1400 can be simplistically viewed as containing data portions 1, 2 and 3 (also designated as portions 1410, 1420 and 1430, respectively). Data portions 1410 and 1430, respectively starting at memory locations $D_1$ and $D_3$ and having corresponding stride one lengths of $Length_1$ and $Length_3$, are desired by a destination application program; while data portion 1420, having a starting address of $D_2$ and a stride one length of $Length_2$, is unnecessary. To prevent data portion 1420 from being transmitted, sending filler function $\Phi_S$ is appropriately modified, such that after the starting location and size of data portion 1410 have been calculated, the starting location of the next data portion is set to location $D_3$, rather than $D_2$, with the length of this portion being set to $Length_3$ rather than $Length_2$, thereby effectively skipping over unwanted data portion 1420 and not transmitting any partial data message packet containing it.

Figure 15:
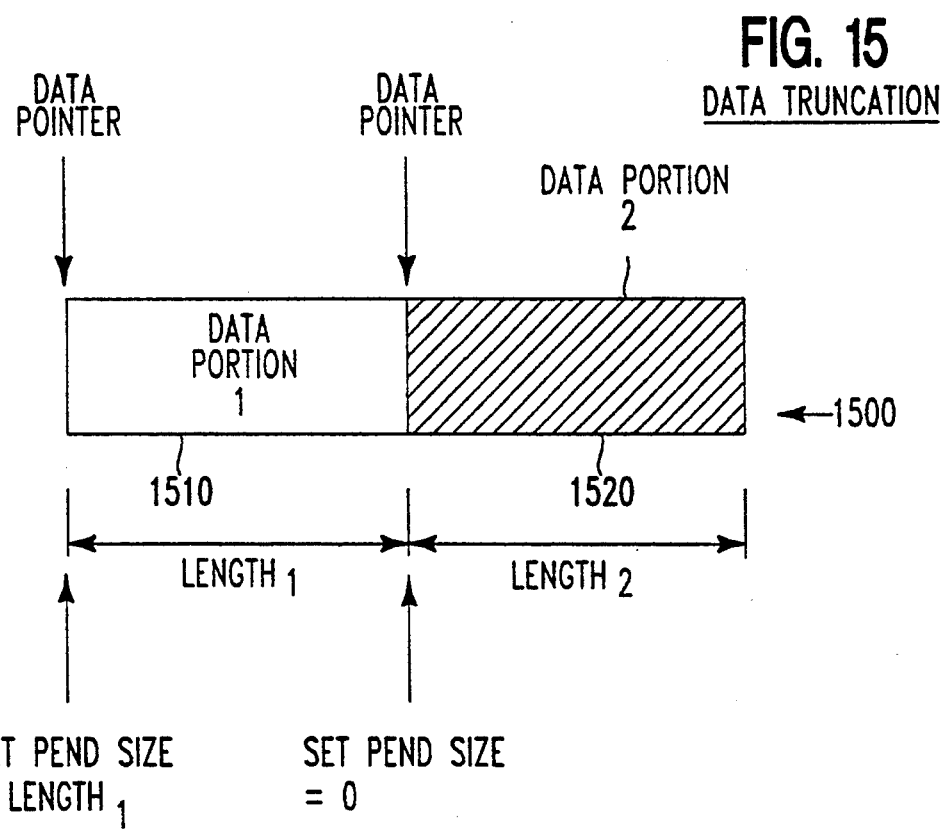
FIG. 15 depicts an illustrative manner through which incoming data 1500 can be truncated upon reception through use of our inventive protocol.

As to truncation, FIG. 15 depicts how our inventive protocol can be illustratively used to truncate incoming data 1500 upon its reception. In essence, truncation is accomplished, through the receiving filler function, by simply setting the pend size to zero. Doing so instructs the communication sub-system that no further application data is to follow and hence terminate the receiving operation and issue a complete callback to the destination application program. Specifically, in this case, application data 1500 to be transferred can be simplistically viewed as containing data portions 1 and 2 (also designated as portions 1510 and 1520, respectively). Assume, the destination application program only requires data portion 1510 but has no use for data portion 1520. Hence, once data portion 1510 has been received at the destination processing element and stored within the corresponding application data memory thereat, the receiving filler function, $\Phi_R$, can be modified to merely set the data length, and hence the pend size, for the next stride one memory area, i.e. that which would have been used to store incoming data portion 1520, to zero. Consequently, once data portion 1510 has been written into the destination application data memory, the communication sub-system issues a complete callback which, when invoked, establishes a receive complete exit back to the destination application program.

By now those skilled in the art clearly realize that although we have described our inventive protocol as utilizing a distinct high level application program and a distinct low level application interface, such a sharp demarcation therebetween is not necessary. In that regard, the application program can be written to contain its own application interface. Furthermore, an application program can have any number of internal application interfaces. Moreover, an application interface can incorporate a number of different sending filler functions and a different number of differing receiving filler functions, with the specific filler function corresponding to each particular application program that is function through that interface. In this regard, the specific sending filler function would be chosen based upon the organization, stride and location of the specific application data stored within the originating application data memory; the specific receiving filler function would be chosen based upon the same characteristics but associated the destination application data memory and the application data to be written therein.

Furthermore, although we have described our inventive protocol in terms of transferring application data, this protocol can be used to transfer any form of digital information, e.g. programs or data, from one memory to another with different arbitrarily varying strides to be used therefor. In that regard, these memories need not be physically distinct memory units, but rather can simply be two logically separate storage areas situated within a common physical memory unit.

In addition, even though we have clearly described our inventive protocol in terms of transferring packets, each containing a corresponding data portion, generally speaking, our protocol can be used to transfer a data portion within a message, of nearly any type, regardless of whether that message takes the form of a packet or not. In that regard, those skilled in the art can readily adapt our protocol, and its implementation described herein, for use with any of a wide variety of communications fabrics, which transport messages, of one type or another, but which are not necessarily packet based.

Although a preferred embodiment, along with various extensions thereof all of which incorporate the teachings of our present invention, has been shown and described in detail herein, those skilled in the art can readily devise many other varied embodiments that still incorporate these teachings.

We claim:

1. A method for transferring digital information stored in a first memory at an originating point and at a first arbitrarily varying stride into a second memory at a destination point and at a second arbitrarily varying stride, said originating and destination points being connected to a communications fabric, said method comprising the steps of:

at the originating point:
   determining, in response to a first pre-defined function, a first starting location and a first size of a portion of the digital information stored in said first memory, all of said digital information being stored at said first arbitrarily varying stride within said first memory but said portion being stored with a stride one organization;
   reading, in response to said first starting location and to said first size, a corresponding stride one section of the first memory so as to obtain the digital information portion therefrom;
   forming, in response to said reading step, a message containing the portion so read and transmitting said message into said communications fabric; and
   repeating said determining, reading, and forming and transmitting steps for each successive portion of said digital information, wherein each of said portions of the digital information is stored within a separate corresponding section of said first memory and with a stride one organization therein, so as to form a plurality of messages wherein each of said messages transfers a corresponding one of said digital information portions across said communications fabric and all of said messages collectively transfer all of said digital information; and at the destination point:
   receiving one of said messages from said communications fabric;
   ascertaining, in response to a second pre-defined function, a second starting location and a second size of a stride one section of said second memory into which a corresponding one of said digital information portions contained within said one message received from the communications fabric is to be stored;
   writing, in response to said receiving step and to second starting location and said second size, said corresponding one digital information portion from said one message into said section of said second memory; and
   repeating said receiving, ascertaining and writing steps for every other one of said messages so as to successively write each one of the portions of said digital information contained therein into a separate corresponding stride one section of said second memory such that all of said digital information is collectively organized within said second memory at said second arbitrarily varying stride.

2. The method in claim 1 wherein said first and second arbitrarily varying strides are unequal.

3. The method in claim 2 wherein either said first or second arbitrarily varying stride is a complex varying stride.

4. The method in claim 2 wherein said first and second pre-defined functions are pre-defined sending and receiving filler functions, respectively, which successively determine the first starting location and the first size of each portion of the digital information stored within said first memory at the first arbitrarily varying stride and the second starting location and the second size of each stride one section in said second memory into which each corresponding one of said portions is to be stored, respectively.

5. The method in claim 2 wherein the originating point implements first and second pre-defined processes and a pre-defined communications process, and said method further comprises the steps of:

in the first pre-defined process:
   issuing a message control block (MCB) to instruct the communications process to transmit an initial one of said digital information portions over said communications fabric, wherein said MCB contains a protocol header, starting location, a length field, a complete callback field, a pend size and a pending callback field; said length field specifying a size of all the digital information to be transferred and the pend size field containing a length of the corresponding one of said digital information portions contained within said each message; and
   updating the MCB, such that said starting location and pend size fields are set equal to values of starting location and length ascertained by said second pre-defined process, for a next successive one of said digital information portions and, in response thereto, issuing an updated MCB as said MCB;

in the communications process:

reading, in response to said MCB, an associated one of said digital information portions from a corresponding stride one section of said first memory;

forming, in response to said protocol header, a corresponding one of said messages to contain said associated one digital information portion and transmitting said corresponding one of said messages over said communications fabric to said destination point; and issuing a pending callback, as defined in the pending callback field, to the second pre-defined process, in the event said digital information contains additional data portions that have not yet been transmitted through corresponding ones of said messages, or a complete callback, as defined in the complete callback field, to the first pre-defined process, in the event all of said digital information has been transmitted; and in the second pre-defined process:

ascertaining, in response to the occurrence of said pending callback and said first pre-defined function, the starting location and pend size for the next successive one of said digital information portions with a stride one organization and situated within said first memory.

6. The method in claim 5 wherein, in the communications process, the issuing step comprises the steps of:

forming a cumulative total of the pend sizes of all of the digital information portions that have been transmitted thusfar; and comparing the cumulative total against a value of the length field and issuing the pending callback in the event the cumulative total is less than the value of the length field or the complete callback in the event the cumulative total equals the value of the length field.

7. The method in claim 5 wherein said digital information is application data, said communications fabric and said messages are respectively a packet network and packets, said first and second memories are first and second application data memories and associated with first and second processing elements, and wherein each of said processing elements implements said communications process and the first and second pre-defined processes, with the first and second pre-defined processes being an application program and an applications interface, respectively.

8. The method in claim 5 further comprising, in said second pre-defined process, the step of setting the starting location and pend size so as to skip over an unwanted portion of said digital information thereby filtering said digital information by preventing the unwanted portion from being transmitted.

9. The method in claim 2 wherein the destination point implements first and second pre-defined processes and a pre-defined communications process, and said method further comprises the steps of:

in the communications process:

issuing, in response to a portion of an initial one of said messages received from said communications fabric, a message control block (MCB) stub to instruct the first pre-defined process to determine a starting location and size for an initial portion of the digital information contained in said initial one message, wherein said MCB stub contains non-zero values for a protocol header and length field as supplied by the portion of said initial one message and said MCB stub further contains zero values for starting location, complete callback, pending callback and pend size fields;

first extracting, in response to a completed MCB, an initial one of said digital information portions from the initial one message;

first writing, in response to said first extracting step, said initial one digital information portion contained in said initial one message into an initial stride one section of said second memory as defined by said starting location and said pend size fields in said completed MCB;

second extracting, in response to an updated MCB, a next successive one of said digital information portions from a corresponding successive one of said messages;

second writing, in response to said second extracting step, said successive one of the digital information portions into a corresponding successive stride one section of said second memory as defined by said starting location and said pend size fields in said updated MCB; and issuing a pending callback, as defined in the pending callback field, to the second pre-defined process, in the event said digital information contains additional digital information portions that have not yet been received through corresponding ones of said messages, or a complete callback, as defined in the complete callback field, to the first pre-defined process, in the event all of said digital information has been received and written into said second memory; and in the first pre-defined process:

invoking said second pre-defined process to ascertain the starting location and size of the initial stride one section of the second memory within which the initial portion of said digital information is to be written;

converting, in response to the starting location and size ascertained by said second pre-defined process and for the initial one of said digital information portions, the MCB stub into a completed MCB by appropriately setting the zero valued fields to non-zero values, wherein the starting location field is set to contain the starting location ascertained by said second pre-defined process and the pend size field is set to the size ascertained by the second pre-defined process; and updating said completed MCB, with values of said starting location and pend size ascertained by said second pre-defined process for each next successive one of said digital information portions, to form the updated MCB and, in response thereto, issuing the updated MCB; and in the second pre-defined process:

ascertaining, in response to said second pre-defined function and either an invocation from said first pre-defined process or to the occurrence of said pending callback, the starting location and size of the corresponding successive stride one section within the second memory into which the next successive digital information portion is to be written.

10. The method in claim 9 wherein, in the communications process, the issuing step comprises the steps of:

forming a cumulative total of the pend sizes of all of the digital information portions that have been transmitted thusfar; and comparing the cumulative total against a value of the length field and issuing the pending callback in the event the cumulative total is less than the value of the length field or the complete callback in the event the cumulative total equals the value of the length field.

11. The method in claim 9 wherein said digital information is data, said communications fabric and said messages are respectively a packet network and packets, said first and second memories are first and second application data memories and associated with first and second processing elements, and with each of said processing elements implements said communications process and the first and second pre-defined processes, with the first and second pre-defined processes being an application program and an applications interface, respectively.

12. The method in claim 9 further comprising, in said second pre-defined process, the step of setting the pend size equal to zero so as to cease writing any subsequent portions of said digital information into said second memory so as to truncate said digital information being received at said destination point.

13. Apparatus for transferring digital information stored in a first memory at an originating point and at a first arbitrarily varying stride into a second memory at a destination point and at a second arbitrarily varying stride, said originating and destination points being connected to a communications fabric, said apparatus comprising:

at the originating point:
means for determining, in response to a first pre-defined function, a first starting location and a first size of a portion of the digital information stored in said first memory, all of said digital information being stored at said first arbitrarily varying stride within said first memory but said portion being stored with a stride one organization;
means for reading, in response to said first starting location and to said first size, a corresponding stride one section of the first memory so as to obtain the digital information portion therefrom;
means for forming, in response to said reading means, a message containing the portion so read and transmitting said message into said communications fabric; and
means for invoking said determining, reading, and forming and transmitting means for each successive portion of said digital information, wherein each of said portions of the digital information is stored within a separate corresponding section of said first memory and with a stride one organization therein, so as to form a plurality of messages wherein each of said messages transfers a corresponding one of said digital information portions across said communications fabric and all of said messages collectively transfer all of said digital information; and at the destination point:
means for receiving one of said messages from said communications fabric;
means for ascertaining, in response to a second pre-defined function, a second starting location and a second size of a stride one section of said second memory into which a corresponding one of said digital information portions contained within said one message received from the communications fabric is to be stored;
means for writing, in response to said receiving means and to second starting location and said second size, said corresponding one digital information portion from said one message into said section of said second memory; and
means for invoking said receiving, ascertaining and writing means for every other one of said messages so as to successively write each one of the portions of said digital information contained therein into a separate corresponding stride one section of said second memory such that all of said digital information is collectively organized within said second memory at said second arbitrarily varying stride.

14. The apparatus in claim 13 wherein said first and second arbitrarily varying strides are unequal.

15. The apparatus in claim 14 wherein either said first or second arbitrarily varying stride is a complex varying stride.

16. The apparatus in claim 14 wherein said first and second pre-defined functions are pre-defined sending and receiving filler functions, respectively, which successively determine the first starting location and the first size of each portion of the digital information stored within said first memory at the first arbitrarily varying stride and the second starting location and the second size of each stride one section in said second memory into which each corresponding one of said portions is to be stored, respectively.

17. The apparatus in claim 14 further comprising, at the originating point:
a first program having:
means for issuing a message control block (MCB) to instruct a communications system to transmit an initial one of said digital information portions over said communications fabric, wherein said MCB contains a protocol header, starting location, a length field, a complete callback field, a pend size and a pending callback field; said length field specifying a size of all the digital information to be transferred and the pend size field containing a length of the corresponding one of said digital information portions contained within said each message; and
means for updating the MCB, such that said starting location and pend size fields are set equal to values of starting location and length ascertained by a second program, for a next successive one of said digital information portions and, in response thereto, issuing an updated MCB as said MCB;
the communications system having:
means for reading, in response to said MCB, an associated one of said digital information portions from a corresponding stride one section of said first memory;
means for forming, in response to said protocol header, a corresponding one of said messages to contain said associated one digital information portion and transmitting said corresponding one of said messages over said communications fabric to said destination point; and
means for issuing a pending callback, as defined in the pending callback field, to the second program, in the event said digital information contains additional data portions that have not yet been transmitted through corresponding ones of said messages, or a complete callback, as defined in the complete callback field, to the first program, in the event all of said digital information has been transmitted; and the second program comprising:
means for ascertaining, in response to the occurrence of said pending callback and said first pre-defined function, the starting location and pend size for the next successive one of said digital information portions with a stride one organization and situated within said first memory.

18. The apparatus in claim 17 wherein, in the communications system, the issuing means comprises means for forming a cumulative total of the pend sizes of all of the digital information portions that have been transmitted thusfar and comparing the cumulative total against a value of the length field and issuing the pending callback in the event the cumulative total is less than the value of the length field or the complete callback in the event the cumulative total equals the value of the length field.

19. The apparatus in claim 17 wherein said digital information is application data, said communications fabric and said messages are respectively a packet network and packets, said first and second memories are first and second application data memories and associated with first and second processing elements, and wherein each of said processing elements implements said communications system and the first and second programs, with the first and second programs being an application program and an applications interface, respectively.

20. The apparatus in claim 14 further comprising at the destination point:
a communications system having:
means for issuing, in response to a portion of an initial one of said messages received from said communications fabric, a message control block (MCB) stub to instruct a first program to determine a starting location and size for an initial portion of the digital information contained in said initial one message, wherein said MCB stub contains non-zero values for a protocol header and length field as supplied by the portion of said initial one message and said MCB stub further contains zero values for starting location, complete callback, pending callback and pend size fields;
first means for extracting, in response to a completed MCB, an initial one of said digital information portions from the initial one message;
first means for writing, in response to said first extracting means, said initial one digital information portion contained in said initial one message into an initial stride one section of said second memory as defined by said starting location and said pend size fields in said completed MCB;
second means for extracting, in response to an updated MCB, a next successive one of said digital information portions from a corresponding successive one of said messages;
second means for writing, in response to said second extracting means, said successive one of the digital information portions into a corresponding successive stride one section of said second memory as defined by said starting location and said pend size fields in said updated MCB; and
means for issuing a pending callback, as defined in the pending callback field, to a second program, in the event said digital information contains additional digital information portions that have not yet been received through corresponding ones of said messages, or a complete callback, as defined in the complete callback field, to the first program, in the event all of said digital information has been received and written into said second memory; and the first program having:
means for invoking the second program to ascertain the starting location and size of the initial stride one section of the second memory within which the initial portion of said digital information is to be written;
means for converting, in response to the starting location and size ascertained by said second program and for the initial one of said digital information portions, the MCB stub into a completed MCB by appropriately setting the zero valued fields to non-zero values, wherein the starting location field is set to contain the starting location ascertained by said second program and the pend size field is set to the size ascertained by the second program; and
means for updating said completed MCB, with values of said starting location and pend size ascertained by said second program for each next successive one of said digital information portions, to form the updated MCB and, in response thereto, issuing the updated MCB; and the second program having:
means for ascertaining, in response to said second pre-defined function and either an invocation from said first program or to the occurrence of said pending callback, the starting location and size of the corresponding successive stride one section within the second memory into which the next successive digital information portion is to be written.

21. The apparatus in claim 20 wherein, in the communications system, the issuing means comprises means for forming a cumulative total of the pend sizes of all of the digital information portions that have been transmitted thusfar and comparing the cumulative total against a value of the length field and issuing the pending callback in the event the cumulative total is less than the value of the length field or the complete callback in the event the cumulative total equals the value of the length field.

22. The apparatus in claim 20 wherein said digital information is data, said communications fabric and said messages are respectively a packet network and packets, said first and second memories are first and second application data memories and associated with first and second processing elements, and wherein each of said processing elements implements said communications system and the first and second programs, with the first and second programs being an application program and an applications interface, respectively.

* * * * *